US010530540B2

(12) United States Patent
Beidas et al.

(10) Patent No.: US 10,530,540 B2
(45) Date of Patent: Jan. 7, 2020

(54) OFDM-LIKE SIGNALING FOR BROADBAND SATELLITE APPLICATIONS

(71) Applicant: Hughes Network Systems, LLC, Germantown, MD (US)

(72) Inventors: Bassel F. Beidas, Germantown, MD (US); Rohit Iyer Seshadri, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 178 days.

(21) Appl. No.: 15/849,361

(22) Filed: Dec. 20, 2017

(65) Prior Publication Data

US 2018/0175978 A1    Jun. 21, 2018

Related U.S. Application Data

(60) Provisional application No. 62/436,658, filed on Dec. 20, 2016, provisional application No. 62/487,995, filed on Apr. 20, 2017.

(51) Int. Cl.
*H04L 5/00*     (2006.01)
*H04L 25/06*    (2006.01)
(Continued)

(52) U.S. Cl.
CPC ............ *H04L 5/001* (2013.01); *H04L 5/0046* (2013.01); *H04L 12/433* (2013.01);
(Continued)

(58) Field of Classification Search
None
See application file for complete search history.

(56) References Cited

U.S. PATENT DOCUMENTS 6,252,912 B1   6/2001   Salinger
6,775,330 B2   8/2004   Bach
(Continued)

OTHER PUBLICATIONS

International Search Report and Written Opinion for PCTUS17/67728 dated Mar. 9 2018, 14 pages.

*Primary Examiner* — Hong S Cho
(74) *Attorney, Agent, or Firm* — Sheppard, Mullin, Richter & Hampton LLP

(57) ABSTRACT

Implementations described herein are directed to satellite transmitters and receivers for applying OFDM-like signaling in broadband satellite transmissions. In such systems, one or more data signals may be shaped and composited into a composite data signal at an OFDM-like transmitter for transmission over a satellite channel. The data signals that are carried over the satellite channel by the composited signal may have their own carrier, and each signal may carry multiple OFDM subcarriers. Further implementations are directed to correcting for distortion in satellite communications systems that utilize OFDM-like signaling. This distortion correction may account for the linear and nonlinear distortion introduced by the high power amplifier of a satellite receiving a composite signal, the linear and nonlinear distortion caused by the interaction of the signals in the composite, the linear and nonlinear distortion caused by the interaction between OFDM subcarriers, and/or the linear and nonlinear distortion caused by inter-carrier interference.

29 Claims, 19 Drawing Sheets

(51) Int. Cl.
    *H04L 27/26*      (2006.01)
    *H04W 84/06*     (2009.01)
    *H04L 12/433*    (2006.01)
    *H04L 25/03*     (2006.01)
    *H04L 25/02*     (2006.01)
    *H04W 88/06*     (2009.01)

(52) U.S. Cl.
    CPC .. *H04L 25/03343* (2013.01); *H04L 25/03834* (2013.01); *H04L 25/067* (2013.01); *H04L 27/2604* (2013.01); *H04L 27/2628* (2013.01); *H04W 84/06* (2013.01); *H04L 25/024* (2013.01); *H04L 27/2627* (2013.01); *H04W 88/06* (2013.01)

(56) References Cited

U.S. PATENT DOCUMENTS

| | | | |
|---|---|---|---|
| 2004/0252791 | A1 | 12/2004 | Shen |
| 2005/0018598 | A1* | 1/2005 | Borran .................... H04L 5/026 370/208 |
| 2009/0153132 | A1 | 6/2009 | Tufillaro |
| 2009/0274233 | A1* | 11/2009 | Niu .................... H04L 27/0014 375/267 |
| 2010/0046683 | A1* | 2/2010 | Beukema ............. H04L 7/0062 375/355 |
| 2010/0091920 | A1 | 4/2010 | Alexander |
| 2011/0058471 | A1 | 3/2011 | Zhang |
| 2014/0153625 | A1 | 6/2014 | Vojcic |
| 2016/0164702 | A1 | 6/2016 | Beidas |

\* cited by examiner

OFDM-LIKE SIGNALING FOR BROADBAND SATELLITE APPLICATIONS

CROSS-REFERENCE TO RELATED APPLICATIONS

This application claims the benefit of U.S. Provisional Patent Application No. 62/436,658, filed Dec. 20, 2016, and U.S. Provisional Patent Application No. 62/487,995, filed Apr. 20, 2017, each of which is incorporated herein by reference in its entirety.

BACKGROUND

Orthogonal frequency-division multiplexing (OFDM), a special form of multicarrier modulation (MCM), lies at the core of the air interface of a broad range of current standards, such as wireless local area networks (WLANs) and long-term evolution (LTE) fourth-generation (4G) for cellular communications. Additionally, fifth-generation (5G) terrestrial wireless networks, advancing at accelerated speed and attracting billions of dollars for research and infrastructure development, continue to use OFDM air interface on the downlink. This follows the recent progress in the standardization of 5G new radio access technology as specified by the leading 3rd Generation Partnership Project (3GPP).

SUMMARY

In accordance with implementations of the disclosed technology, OFDM-like signaling techniques for broadband satellite applications and methods for compensating for nonlinear distortion in OFDM-like satellite networks are described below.

In one embodiment, a system includes: a satellite transmitter including: a bit-to-symbol modulator to modulate a plurality of bits to form a plurality of data symbols; an OFDM modulator to modulate the plurality of data symbols onto a plurality of OFDM subcarriers to form a plurality of OFDM modulated data symbols; a pulse-shaping transmit filter to convert the plurality of OFDM modulated data symbols to a transmit signal using a pulse shaping function; and a modulator to modulate the transmit signal onto a carrier wave for transmission as a modulated transmit signal. In implementations, the OFDM modulator is an inverse fast Fourier transform (IFFT) modulator. In implementations, each of the plurality of OFDM modulated data symbols do not include cyclic prefix symbols. In implementations, the satellite transmitter further includes: a transmitter-based correction module to apply data predistortion to the plurality of data symbols or to the plurality of OFDM modulated data symbols. In a particular implementation, the transmitter-based correction module applies data predistortion to the plurality of OFDM modulated data symbols in the time domain.

In implementations, the satellite transmitter further includes: a second bit-to-symbol modulator to modulate a second plurality of bits to form second plurality of data symbols; a second OFDM modulator to modulate the second plurality of data symbols onto the second plurality of OFDM subcarriers to form a second plurality of OFDM modulated data symbols; a second pulse-shaping transmit filter to convert the second plurality of OFDM modulated data symbols to a second transmit signal using a pulse shaping function; a modulator to modulate the second transmit signal onto a second carrier wave for transmission as a second modulated transmit signal; and an adder to add the first and second modulated transmit signals to generate a composite signal. In these implementations, the OFDM modulators may be IFFT modulators. The number of the first plurality of OFDM subcarriers may be the same or different from the number of the second of the plurality of OFDM subcarriers. In alternative implementations, only one of the plurality of data symbols is modulated onto OFDM subcarriers, while the other of the plurality of data symbols is not modulated onto OFDM subcarriers.

In implementations where a composite signal is transmitted by the satellite transmitter, the system may further include: a nonlinear satellite transponder for receiving the composite signal, where the transponder includes a nonlinear amplifier for amplifying the composite transmit signal. The transponder may also include an input multiplexing (IMUX) filter and output multiplexing (OMUX) filter, wherein the IMUX filter is to receive the composite transmit signal, and wherein the OMUX filter is to output the amplified composite signal. In implementations, the satellite transponder transmits the composite signal to a receiver, and the receiver includes a receiver-based correction module to provide frequency-domain distortion correction of symbol segments extracted from the composite signal.

In particular implementations, the system is a satellite gateway, and the composite signal is transmitted on an outroute by the satellite gateway.

In implementations where a composite signal is transmitted, the satellite transmitter may further include: a transmitter-based correction module to apply data predistortion to the first and second pluralities of data symbols or to the first and second pluralities of OFDM modulated data symbols.

In one embodiment, a method includes: modulating a first plurality of data symbols onto a first plurality of OFDM subcarriers to form a first plurality of OFDM modulated data symbols; modulating a second plurality of data symbols onto a second plurality of OFDM subcarriers to form a second plurality of OFDM modulated data symbols; converting the first plurality of OFDM modulated data symbols to a first transmit signal using a pulse shaping function; converting the second plurality of OFDM modulated data symbols to a second transmit signal using a pulse shaping function; modulating the first transmit signal onto a first carrier wave; modulating the second transmit signal onto a second carrier wave; and adding the first and second modulated transmit signals to generate a composite signal for transmission by a satellite terminal. In implementations, modulating the first plurality of data symbols onto a first plurality of OFDM subcarriers and modulating the second plurality of data symbols onto a second plurality of OFDM subcarriers includes applying an inverse fast Fourier transform (IFFT) to each of the first and second pluralities of data symbols.

In implementations, the method further includes: receiving the composite signal at a satellite transponder; and amplifying the composite signal using a high power amplifier of the satellite transponder. The satellite transponder may broadcast the amplified composite signal to one or more downlink receivers.

In implementations, the method further includes: applying data predistortion in the time domain to each of the first plurality and the second plurality of OFDM modulated data symbols. In implementations, each of the plurality of OFDM modulated data symbols do not include cyclic prefix symbols.

In one embodiment, a receiver includes: circuitry for downconverting an input signal received from a satellite transponder; a receive pulse-shaping filter for filtering the downconverted signal; a downsampler for downsampling the filtered signal; a linear equalizer to equalize the down-sampled signal to compensate for linear phase distortion caused by the satellite transponder; and an OFDM demodulator to segment signal samples output by the equalizer into a plurality of OFDM segments and to convert the plurality of OFDM segments into frequency domain symbols. In implementations, the OFDM demodulator is a fast Fourier transform (FFT) demodulator.

In implementations, the satellite receiver further includes: a log-likelihood ratio (LLR) computation module to compute the likelihood that particular symbols extracted from an input signal were transmitted by a satellite transmitter.

In implementations, the satellite receiver further includes: a receiver-based correction module to provide frequency-domain distortion correction of symbol segments output by the OFDM demodulator, wherein the receiver-based correction module receives as an input a plurality of symbol segments output by the OFDM demodulator.

In some implementations, the LLR computation module receives as an input a plurality of symbol segments output by the OFDM demodulator. In some implementations, the LLR computation module receives as an input a plurality of error-corrected symbol segments output by the receiver-based correction module.

In some implementations, the satellite receiver further includes: a forward error correction (FEC) decoder, where the receiver-based correction module iteratively exchanges soft information with the FEC decoder to converge on an estimation of transmitted symbols.

In some implementations of the satellite receiver, the input signal is a composite signal including a plurality of signals, each of the plurality of signals modulated on a respective carrier, and the circuitry is configured to down-convert the composite signal to baseband, where one of the plurality of signals is output by the receive pulse-shaping filter. In these implementations, the satellite receiver may include a receiver-based correction module to provide frequency-domain distortion correction of symbol segments output by the OFDM demodulator, where the receiver-based distortion correction module corrects for distortion from the plurality of signals. In these implementations, the satellite receiver may include a plurality of LLR computation modules and a plurality of FEC decoder modules, each of the plurality of LLR computation modules to receive a plurality of error-corrected symbol segments corresponding to a respective one of the plurality of signals, and each of the plurality FEC decoders to converge on an estimate of transmitted symbols of a respective one of the plurality of signals, wherein the receiver-based correction module iteratively exchanges soft information with each of the plurality of FEC decoders.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

in decibels, where $$\left.\frac{E_s}{N_0}\right|_{NL}$$

is the SNR used in operating a nonlinear satellite transponder. The four different subcarrier modulation schemes are a single carrier modulation (SCM)-based scheme, an OFDM-based scheme without transmitter predistortion correction, an OFDM-based scheme with transmitter signal predistortion correction, and an OFDM-based scheme with transmitter data predistortion correction.

Figure 11:
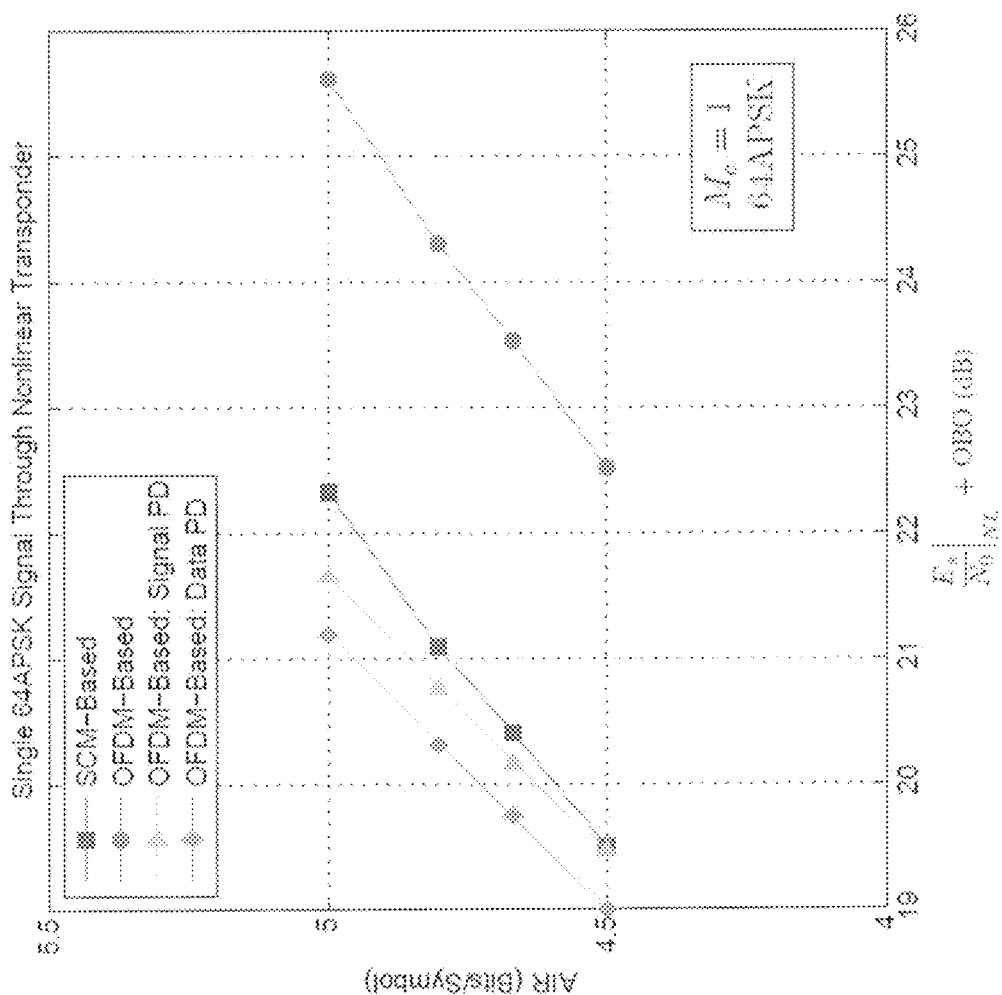

FIG. 11 is a plot showing, for a single 64APSK signal passing through a nonlinear satellite transponder, using four different satellite signaling schemes, the achievable information rate (AIR) in bits/symbol as a function of $$\left.\frac{E_s}{N_0}\right|_{NL} + OBO,$$

in decibels.

Figure 12:
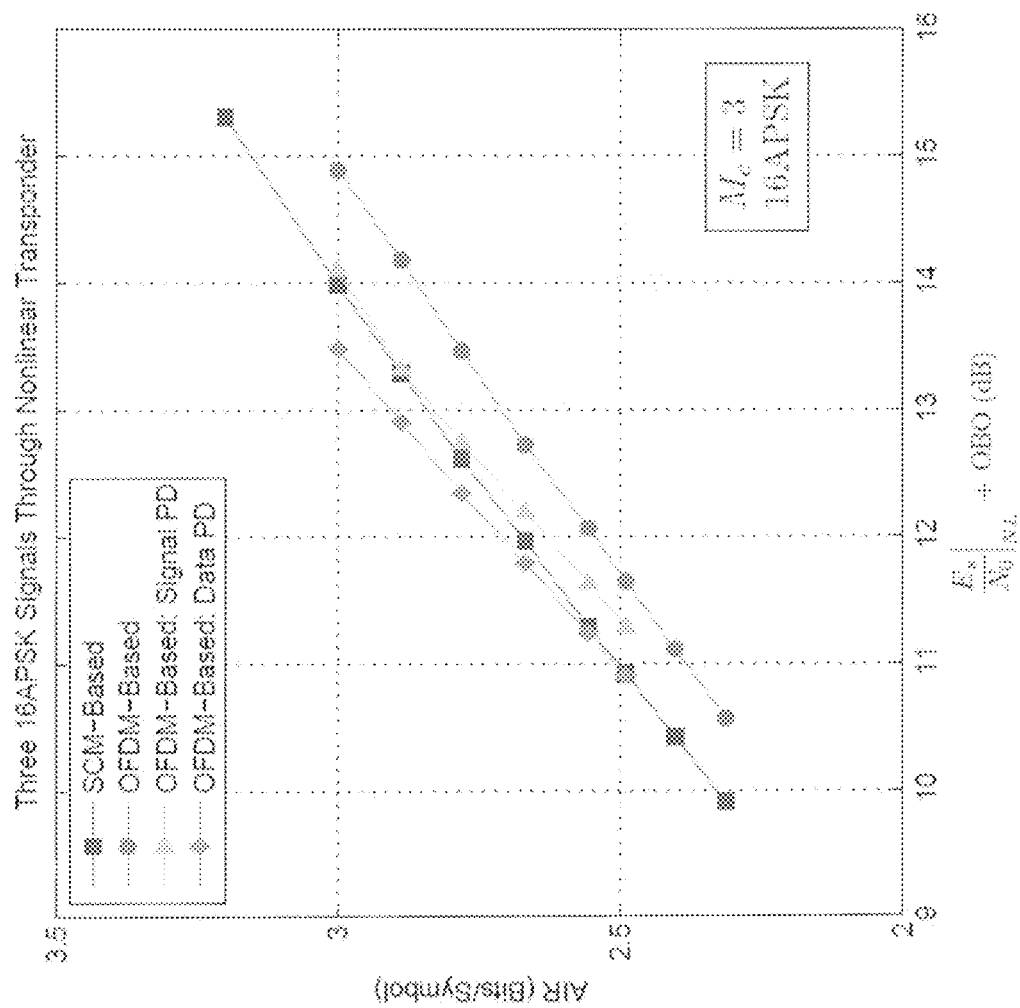

FIG. 12 is a plot showing, for a composite of three 16APSK signals passing through a nonlinear satellite transponder, using four different satellite signaling schemes, the achievable information rate (AIR) in bits/symbol as a function of $$\left.\frac{E_s}{N_0}\right|_{NL} + OBO,$$

in decibels.

Figure 13:
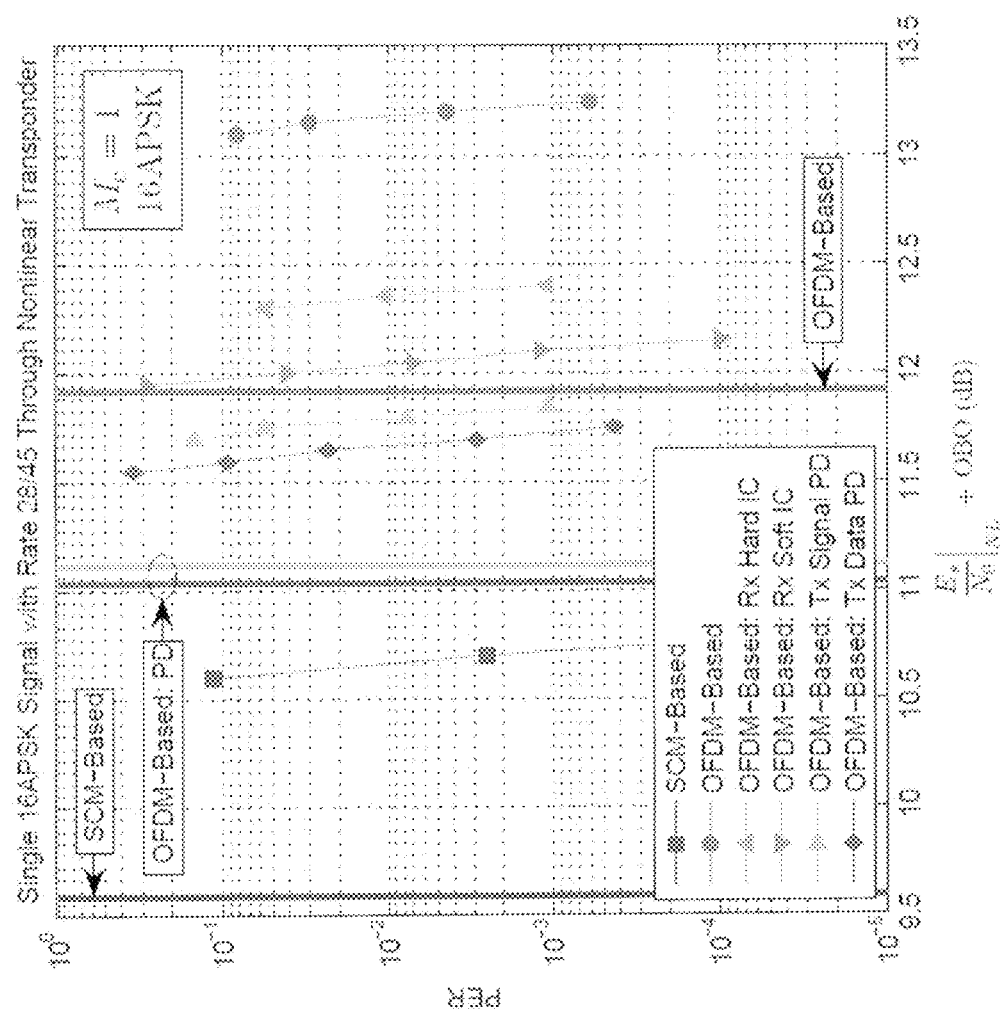

FIG. 13 is a plot showing, for a single 16APSK signal with LDPC code rate 28/45 passing through a nonlinear satellite transponder, using six different satellite signaling schemes, the packet error rate (PER) as a function of $$\left.\frac{E_s}{N_0}\right|_{NL} + OBO,$$

in decibels.

Figure 14:
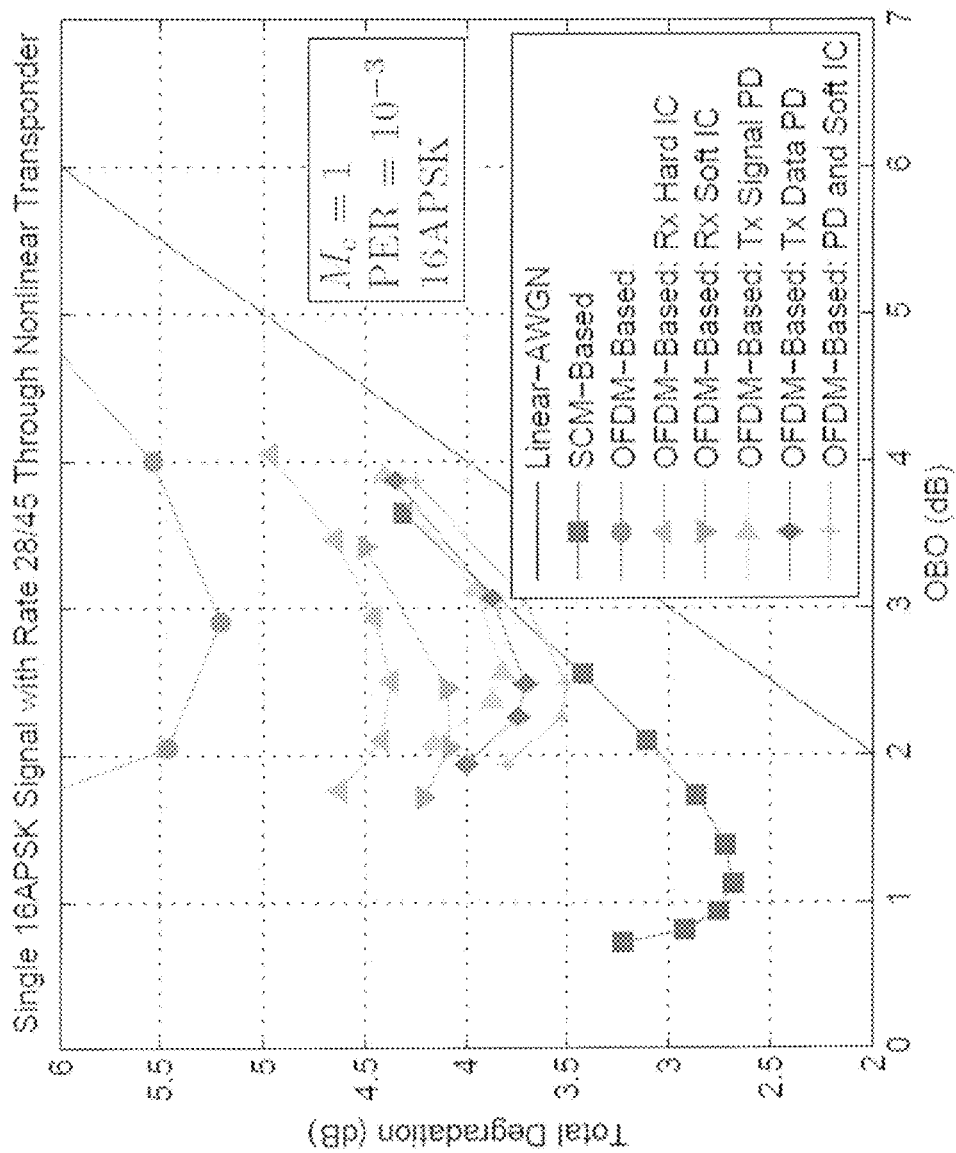

FIG. 14 is a plot showing, for a single 16APSK signal with LDPC code rate 28/45 passing through a nonlinear satellite transponder, using seven different satellite signaling schemes, the coded total degradation, in decibels, versus the OBO level, in decibels.

Figure 15:
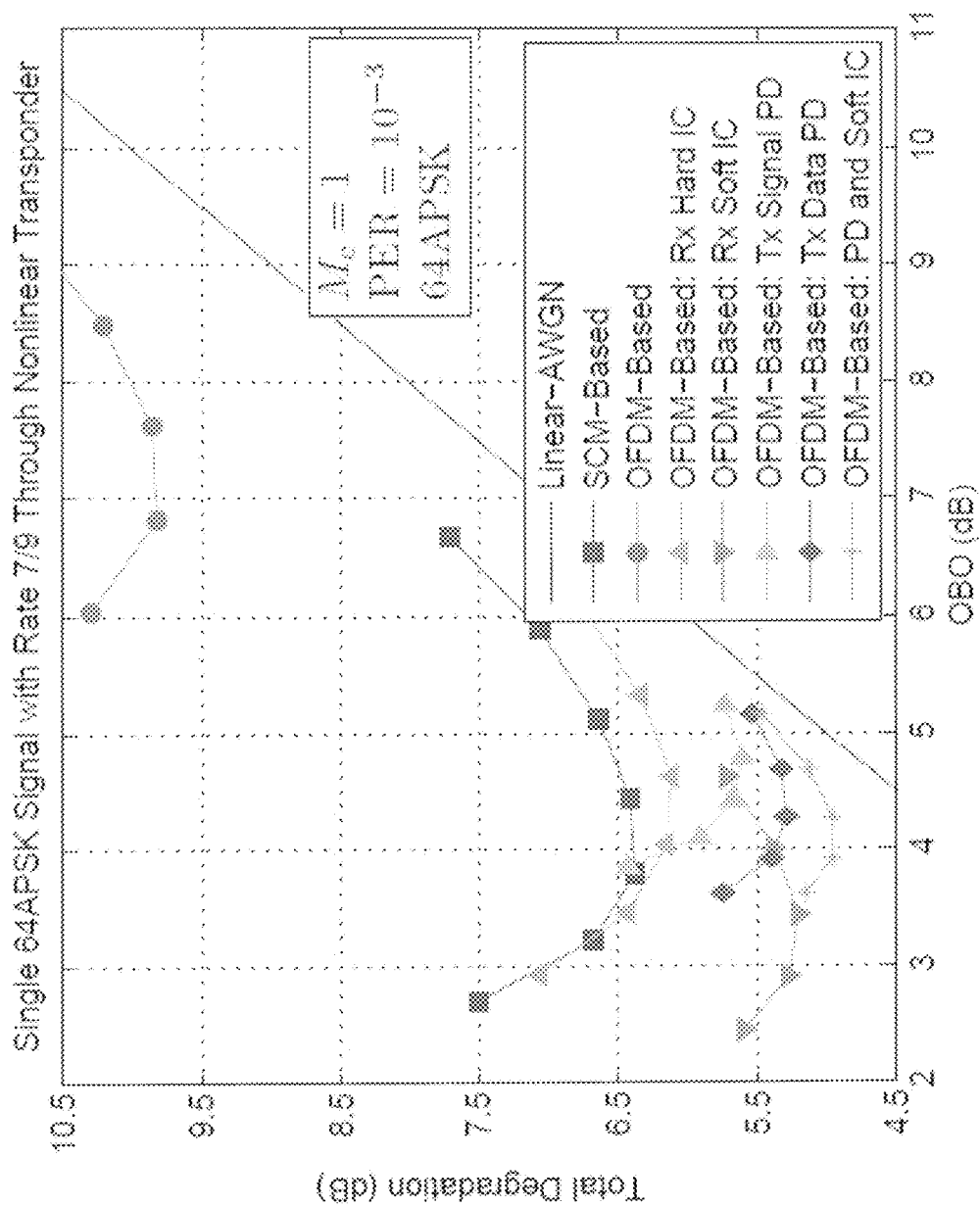

FIG. 15 is a plot showing, for a single 64APSK signal with LDPC code rate 7/9 passing through a nonlinear satellite transponder, using seven different satellite signaling schemes, the coded total degradation, in decibels, versus the OBO level, in decibels.

Figure 16:
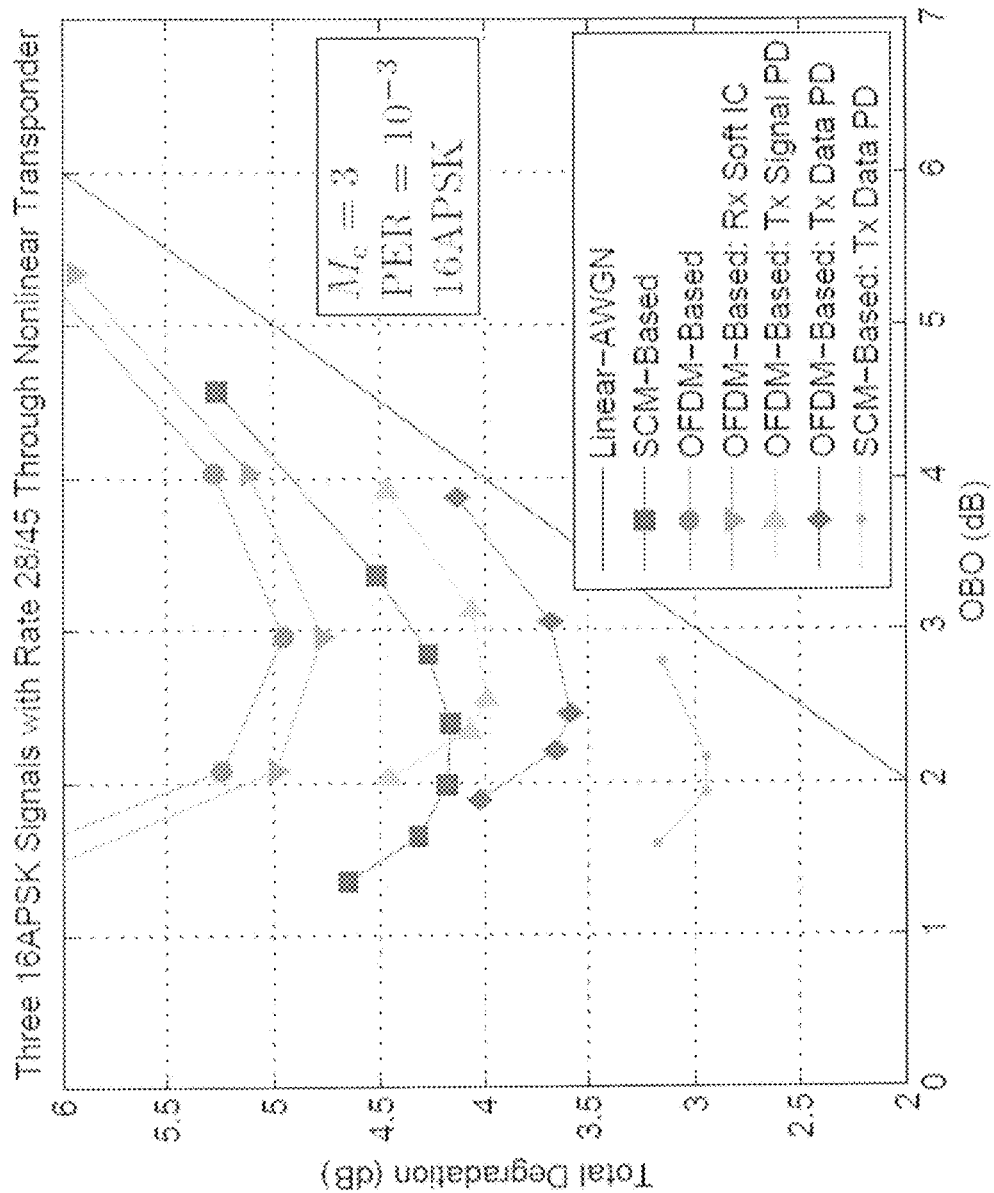

FIG. 16 is a plot showing, for a composite of three 16APSK signals with LDPC code rate 28/45 passing through a nonlinear satellite transponder, using seven different satellite signaling schemes, the coded total degradation, in decibels, versus the OBO level, in decibels.

Figure 17:
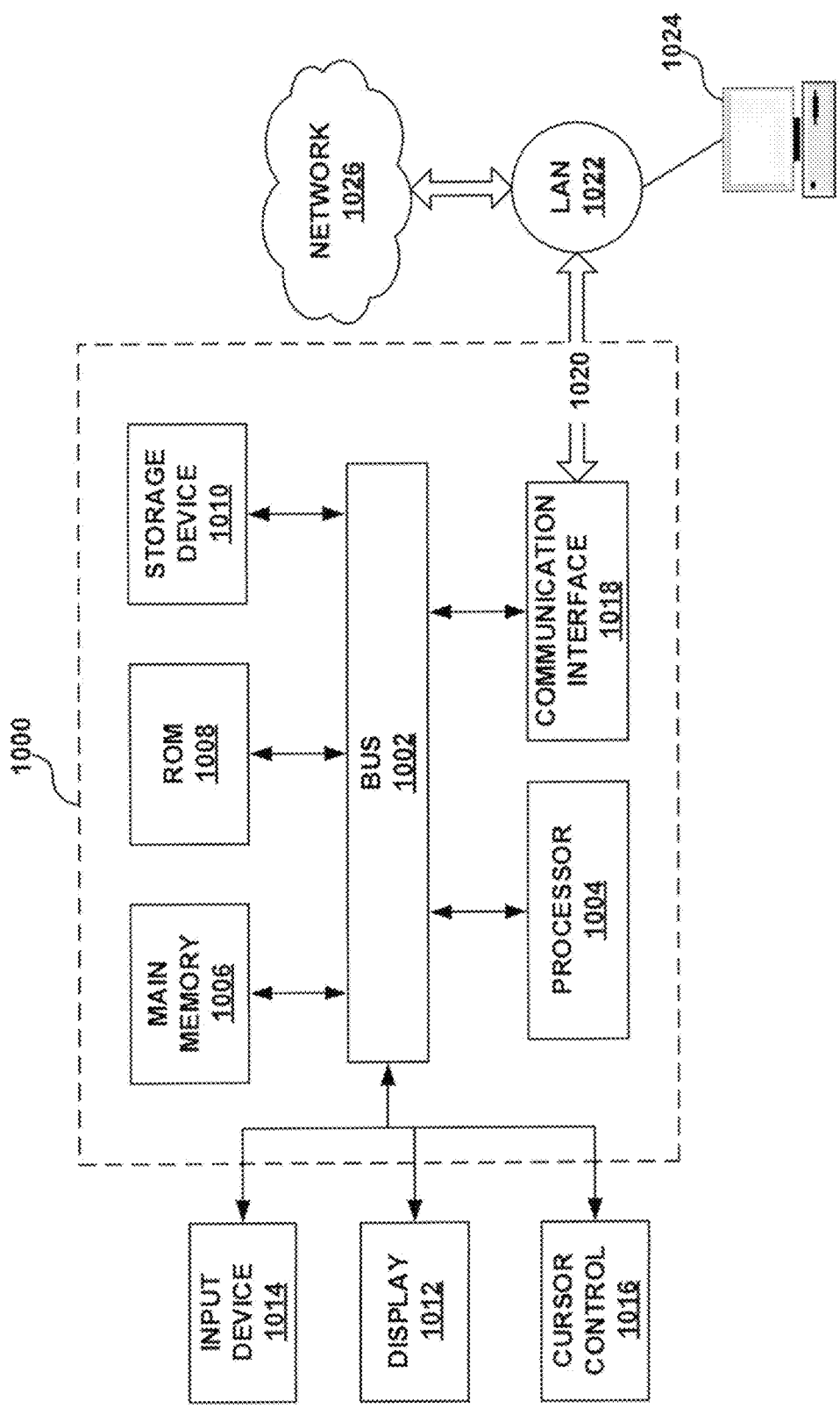

FIG. 17 illustrates an example computing module that may be used in implementing features of various embodiments.

Figure 18:
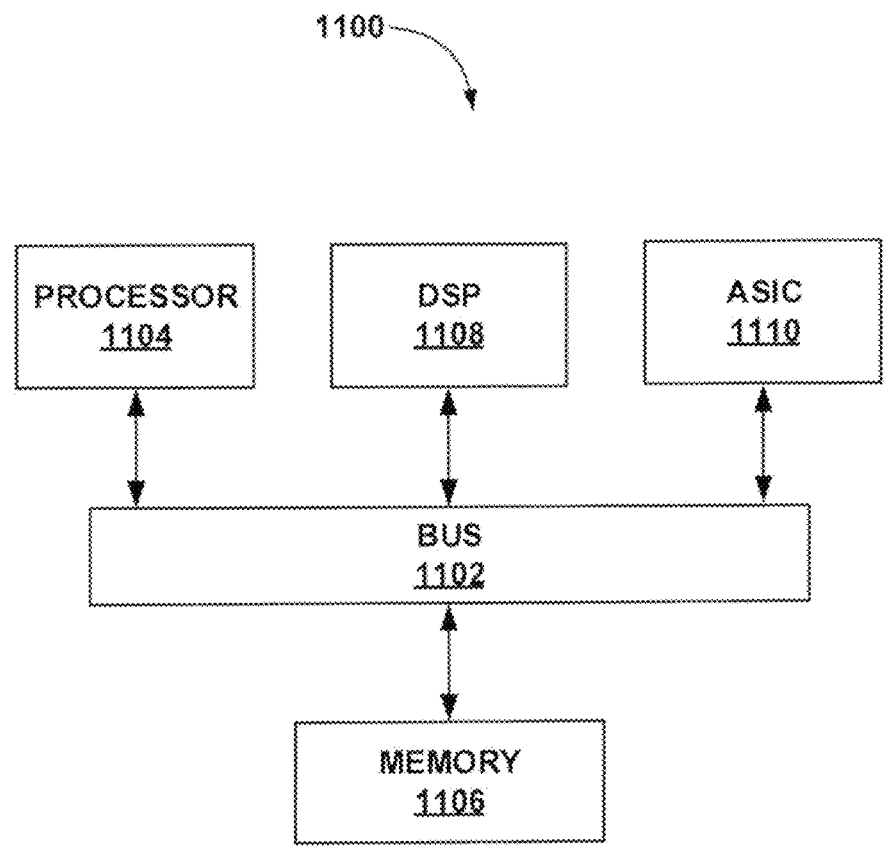

FIG. 18 illustrates an example chip set that can be utilized in implementing partial response signaling methods in accordance with various embodiments.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As noted above, OFDM is a cornerstone of a broad range of current standards, including 5G terrestrial wireless networks. OFDM may deliver wide-ranging benefits to broadband satellite systems, among them: 1) integration with broadband terrestrial networks, due to greater commonality, for future-proofing satellite use cases; 2) a dominant role in providing resilience and ubiquity to 5G services and extending their coverage to regions only satellites can penetrate; 3) resistance to narrowband interference from terrestrial microwave signals as service providers are increasingly demanding a share of the radio frequency spectrum traditionally occupied by satellites, promoting co-existence; 4) robustness to frequency-selective distortion from on-board transponder multiplexing filters, i.e., amplitude distortion appears flat over narrowband OFDM subcarriers; and 5) flexible and highly efficient spectrum utilization by using adaptive loading of the best power allocation and modulation selection, in a location-dependent manner, when channel state information is exploited.

To this end, implementations of the technology described herein are directed to satellite transmitter and satellite receiver designs for applying OFDM-like signaling in broadband satellite transmissions. Particular implementations are directed to applying OFDM-like signaling in the outroute direction, namely, from the satellite gateway to user terminals. The technology disclosed herein may invoke two layers of multicarrier operation. The first layer allows for multiple independent signals to share a single on-board high-power amplifier (HPA) of a satellite transponder, maximizing payload mass efficiency. The second layer of multicarrier operation permits transmitted symbols from each individual signal to modulate multiple narrowband OFDM subcarriers.

Further implementations of the technology disclosed herein are directed to compensating for distortion in satellite communications systems that utilize OFDM-like signaling. A leading obstacle to adopting OFDM in satellite systems is OFDM's inherent sensitivity to nonlinear distortion, due to high peak-to-average power ratio (PAPR) levels, requiring inefficiently operating the on-board HPA of a satellite at a large output back-off (OBO). To this end, novel distortion compensation techniques are described herein for removing the resulting nonlinear distortion from the forward-error correction (FEC) decoder input of a receiver, thereby achieving superior performance and allowing a satellite HPA to operate close to saturation.

As further described below, a computationally efficient distortion construction may be used that incorporates not only input from all the narrowband OFDM subcarriers within a signal, but also those pertaining to other signals that share the same HPA. This distortion construction may subsequently be used at the transmitter in the form of successive data predistortion, and/or at the receiver, in the form of soft cancellation, successively exchanging frequency-domain soft information with decoders.

Figure 1:
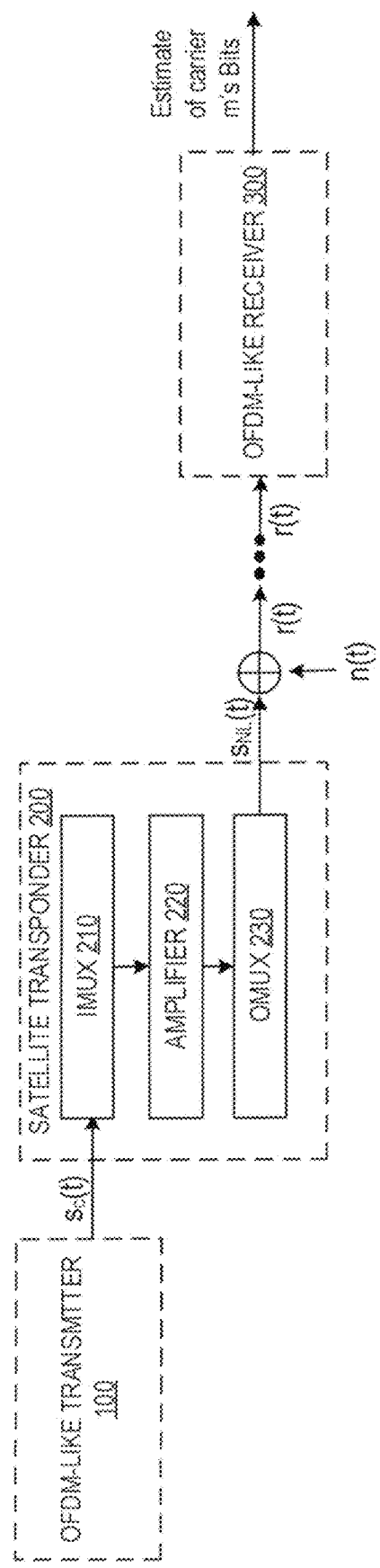
FIG. 1 illustrates an exemplary satellite communication system that utilizes OFDM-like signaling in accordance with implementations.

FIG. 1 illustrates an exemplary satellite communication system that utilizes OFDM-like signaling in accordance with implementations. In the system of FIG. 1, one or more OFDM-like data signals ($s_1(t) \ldots s_{Mc}(t)$) are shaped and composited into a composite data signal $s_c(t)$ at an OFDM-like transmitter 100 (e.g., a transmitting base station of a satellite gateway) using OFDM-like signaling. The one or more data signals that are carried over the satellite channel by the composited signal may have (m) independent carriers (1, . . . , $M_c$) where each carrier corresponds to a respective data signal. Additionally, each data signal may carry multiple OFDM subcarriers. In various implementations, the OFDM-like data signals may carry image, video, audio, and other information. A nonlinear satellite transponder 200 receives composite signal $s_c(t)$ from transmitter 100, and amplifies and rebroadcasts the OFDM-like signal for reception by one or more OFDM-like receivers 300 (e.g., a satellite user terminal such as a very small aperture terminal).

OFDM-Like Transmitter

Figure 2:
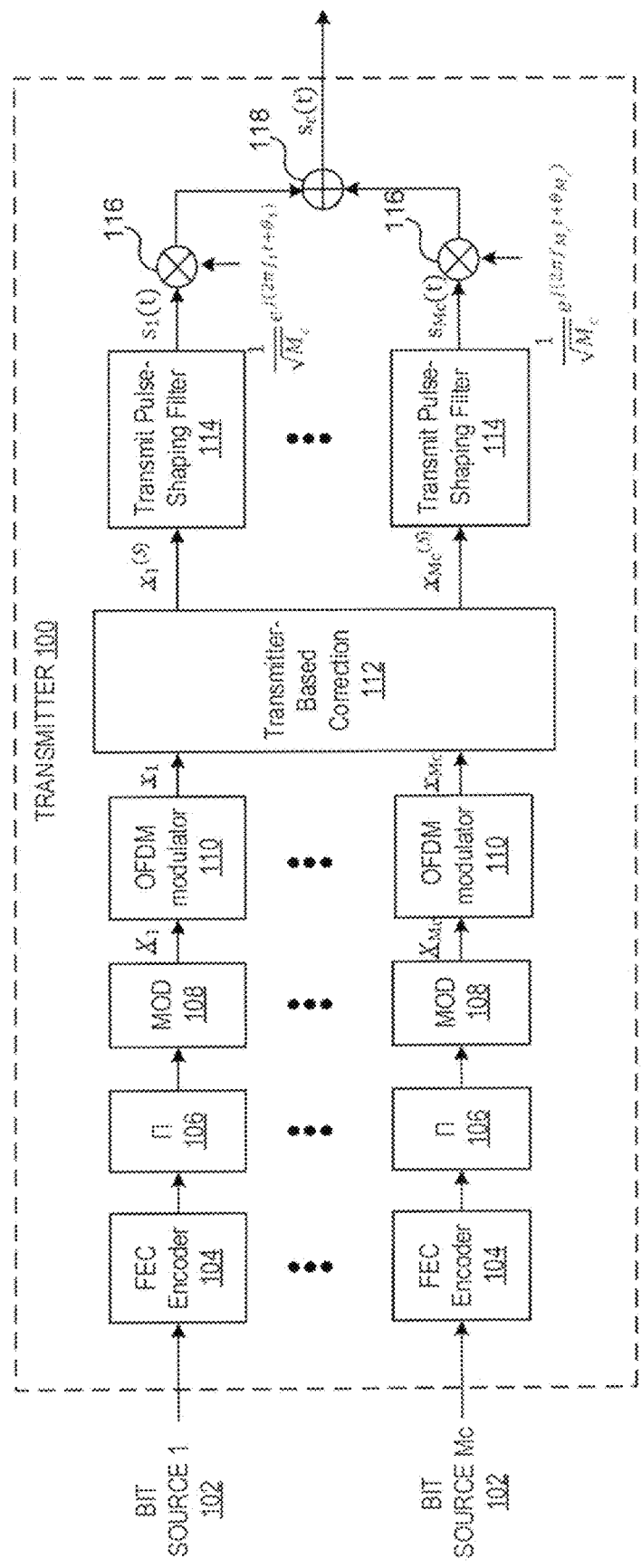
FIG. 2 illustrates one example implementation of an OFDM-like transmitter that may generate a composite signal of frequency-multiplexed independent signals, where each signal is modulated with multiple OFDM subcarriers.

FIG. 2 illustrates one example implementation of an OFDM-like transmitter 100 that may generate a composite signal $s_c(t)$ of $M_c$ frequency-multiplexed independent signals $s_m(t)$, where each signal is modulated with multiple OFDM subcarriers. As illustrated, for each frequency carrier (1, . . . , $M_c$), OFDM-like transmitter 100 includes, a forward error correction (FEC) encoder 104 that receives information from a bit source 102, an interleaver 106 (represented by Π), a modulator 108, an OFDM modulator 110, a transmit pulse-shaping filter 114, and a mixer 116. Additionally, transmitter 100 includes an optional transmitter-based correction module 112 that may apply data predistortion to correct for any distortion that would appear in the signal received by a receiver 300. Although the components of transmitter 100 are shown in a particular order in this example, one of ordinary skill in the art reading this description will understand that the order of components can be varied and some components may be excluded. One of ordinary skill in the art will understand how other transmitter configurations can be implemented, and that one or more of these components can be implemented in either digital form (e.g., as software running on a DSP or other processing device, with the addition of a DAC) or as analog components. Additionally, although bit sources 102 are illustrated in this example implementation as being separate from transmitter 100, in some implementations bit sources 102 may be incorporated into transmitter 100. Further, although transmitter 100 is described with respect to exemplary mathematical implementations and constructions, it is not limited to these precise implementations and constructions.

Bit source 102 provides information bits to be transmitted to FEC encoder 104. The information can include, for example, images, video, audio, text and other data. FEC encoder 104 performs forward error correction by adding redundancy to information data bits signal 102. Forward error correction improves the capacity of a channel by adding redundant information to the data being transmitted through the channel. Examples of forward error correction codes that can be applied by FEC encoder 104 can include block codes (e.g., turbo codes, low-density parity check codes (LDPC), Reed-Solomon codes, Hamming codes, Hadamard codes, BCH codes, and so on), and convolutional codes.

Interleaver 106 scrambles the encoded data bits by rearranging the bit sequence order to make distortion at receiver 300 more independent from bit to bit. In other words, interleaver 106 rearranges the ordering of the data sequence in a one to one deterministic format. Interleaving may be used to enhance the performance of the FEC codes. Modulator 108 is a bit-to-symbol modulator that modulates the interleaved bits using a bit-to-symbol modulation scheme to form complex-valued data symbols $\underline{X}_m$. The interleaved bits may be modulated using any of a number of different modulation techniques. Examples of modulation schemes that can be implemented include Amplitude Phase Shift Keying (APSK), Quadrature Phase Shift Keying (QPSK), π/M-MPSK, other orders of Multiple Phase Shift Keying MPSK, Quadrature Amplitude Modulation (QAM), and so on.

For each signal, an OFDM modulator 110 is applied such that transmitted symbols from each signal modulate a plurality of narrowband OFDM subcarriers. The number of modulated OFDM subcarriers or size N, can be different (e.g., two more OFDM subcarriers) for each signal to allow different OFDM numerology amongst them. As such, the disclosed transmitter may modulate different numbers of narrowband OFDM subcarriers onto each signal to provide flexibility and efficiency in the satellite communication system. In alternative implementations, only a subset of the signals may be modulated with OFDM subcarriers.

In implementations, OFDM modulator 110 is an inverse fast Fourier transform (IFFT) modulator (e.g., an N-point IFFT) that modulates N narrowband OFDM subcarriers onto the complex-valued data symbols output by modulator 108, where the number N may be different or the same for each signal output by transmitter 100. The use of an IFFT may provide for a computationally efficient modulation with OFDM subcarriers.

In implementations, no guard tones are inserted at the input of the OFDM modulator 110 to avoid reduction in throughput.

An optional transmitter-based correction 112 may be included to apply data predistortion to correct for any distortion that would appear in the signal received by a receiver 300. This distortion correction may take into account the linear and nonlinear distortion caused by the interaction amongst the other OFDM-like signals at the transmitter and any linear and non-linear distortion introduced by a non-linear transponder of the satellite. Particular implementations of a transmitter-based correction 112 that applies data predistortion are further described below. As an alternative to transmitter data predistortion, transmitter signal predistortion may be applied by placing transmitter-based correction 112 after transmit pulse-shaping filters 114.

As illustrated in the example of FIG. 2, transmitter-based correction 112 applies data predistortion after OFDM modulator 110 (e.g., to complex-valued data symbols modulated with narrowband OFDM subcarriers $\underline{x}$ output by an IFFT), which is in the time domain. Alternatively, in other implementations, transmitter-based correction 112 may apply data predistortion before OFDM modulator 110 (i.e., to complex-valued data symbols $\underline{X}$), which is in the frequency domain. In implementations, it may be preferable to apply transmitter-based correction 112 in the time domain to avoid the need for conversions between the time domain and frequency domain in transmitter correction 112.

Transmit pulse-shaping or interpolating filter 114 converts the complex-valued data symbols, modulated with the OFDM subcarriers, to a transmit waveform signal. As shown in the example of FIG. 1, filter 114 is applied on the aggregate of OFDM subcarriers to convert an error-corrected signal $\underline{x}_m^{(s)}$ to a waveform signal $s_m(t)$. In implementations, the pulse-shaping filter may be implemented as a root-raised cosine (RRC) filter, a partial response filter, or other suitable pulse shaping filter. Following filtering of the transmit signal at filter 114, mixer 116 of transmitter 100 mixes the waveform signal $s_m(t)$ of each of the filter outputs with a carrier signal z(t) from a local oscillator (not shown)

to modulate it onto an appropriate carrier for transmission. In implementations, the carrier signal function for a particular carrier m may be represented as $$\frac{1}{\sqrt{M_c}} e^{j(2\pi f_m t + \theta_m)},$$

where $f_m$ is the center frequency and $\theta_m$ is the carrier phase of m-th channel.

The application of a filter 114 on an aggregate of OFDM subcarriers for each signal $\underline{x}_1^{(s)}$ may provide the benefits of oversampling, suppression of interference leaking into adjacent signals in the transmitted signal composite, and limiting the level of out-of-band (OOB) emissions (which is typically high for conventional terrestrial OFDM networks) to provide compatibility with a satellite uplink transmission.

An adder 118 adds output signals $s_m(t)$ from a plurality of transmitting carrier sources to provide a composite signal $s_c(t)$. The output signal from the transmitter (e.g., composite signal) is transmitted to satellite transponder 200. The compositing of multiple independent signals $s_m(t)$ in the example of FIG. 2 for subsequent transmission to a satellite transponder (e.g., for sharing by a single on-board high-power amplifier 220 of the satellite) provides the benefit of maximizing payload mass efficiency of the satellite. In alternative implementations, transmitter 100 may be implemented as a single carrier transmitter that generates signals carrying OFDM subcarriers.

In a particular implementation, the inputs and outputs of each component of ODFM-like transmitter 100 may be mathematically described as follows. The input to the OFDM-like transmitter may be complex-valued symbol sequences, at the symbol rate $T_s^{-1}$, $\{X_{m,n}; n=0, 1, \ldots, N_s-1; m=1, 2, \ldots, M_c\}$, from M-ary amplitude and phase shift keying (APSK) constellation, using a well-chosen bit-to-symbol mapping, of independent FEC-encoded, bit-interleaved bit stream for each signal. The parameter $N_s$ is the length of the data block which spans a codeblock of symbols.

Let $\underline{X}_m$ be the vector of complex-valued data symbols of size $N_f \times 1$, associated with the mth signal, that lie in the frequency domain, or $$\underline{X}_m = [X_{m,0}, X_{m,1}, \ldots, X_{m,N_f-1}]^T \quad (1)$$

The vector $\underline{X}_m$ may be segmented into $N_{OFDM}$ blocks to modulate N orthogonal subcarriers, which for ease of discussion is chosen to be the same for all signals (but need not be), where $$N_{OFDM} = \frac{N_f}{N}. \quad (2)$$

Padding of a small number of extra symbols, ($N_f - N_s$), may be needed to make $N_{OFDM}$ in (2) a whole integer. The padding symbols can be distributed into different blocks or introduced as one segment. The vectors relating to OFDM blocks are stacked to form $\underline{X}_m$ in (1), which can be equivalently represented as $$\underline{X}_m = [\tilde{\underline{X}}_{m,0}^T, \tilde{\underline{X}}_{m,1}^T, \ldots, \tilde{\underline{X}}_{m,N_{OFDM}-1}^T]^T \quad (3)$$

where $$\tilde{\underline{X}}_{m,l} = [X_{m,l\cdot N}, X_{m,l\cdot N+1}, \ldots, X_{m,(l+1)\cdot N-1}]^T \quad (4)$$

is of size $N \times 1$, $l=0, 1, \ldots, N_{OFDM}-1$, and $m=1, 2, \ldots, M_c$. Each vector $\tilde{\underline{X}}_{m,l}$ in (4) is further processed by an N-point IFFT to generate the lth OFDM symbol for the mth signal as $$\tilde{x}_{m,l,k} = \frac{1}{\sqrt{N}} \cdot \sum_{n=0}^{N-1} \tilde{X}_{m,l,n} \cdot e^{j2\pi k n/N}, \quad (5)$$

where $\tilde{X}_{m,l,n}$ is the nth component of vector $\tilde{\underline{X}}_{m,l}$ in (4) and $k=0, 1, \ldots, N-1$. The samples $\tilde{x}_{m,l,k}$ in (5) are stacked to form the input $\underline{x}_m$ in the time domain as $$\underline{x}_m = [\tilde{\underline{x}}_{m,0}^T, \tilde{\underline{x}}_{m,1}^T, \ldots, \tilde{\underline{x}}_{m,N_{OFDM}-1}^T]^T, \quad (6)$$

where $$\tilde{\underline{x}}_{m,l} = [\tilde{x}_{m,l,0}, \tilde{x}_{m,l,1}, \ldots, \tilde{x}_{m,l,N-1}]^T, \quad (7)$$

is of size $N \times 1$.

Alternatively, the OFDM block $\tilde{\underline{x}}_{m,l}$ in (7) can be generated by a matrix-vector multiplication as $$\tilde{\underline{x}}_{m,l} = F^H \cdot \tilde{\underline{X}}_{m,l} \quad (8)$$

where F is an N×N discrete Fourier transform (DFT) matrix and $l=0, 1, \ldots, N_{OFDM}-1$. An optional time-domain successive compensator, with S stages (e.g., transmitter-based correction 112) and further described below, may process the resulting complex-valued symbol sequences, generating a modified set of symbols, also at rate $T_s^{-1}$, $\{x_{m,k}^{(S)}; k=0, 1, \ldots, N_f-1; m=1, 2, \ldots, M_c\}$. The individual waveforms $s_m^{(t)}$ may be digitally modulated using the transmit pulse shaping filter $p_{m,T}(t)$ and given by $$s_m(t) = \sum_{k=0}^{N_f-1} x_{m,k}^{(S)} \cdot p_{m,T}(t - kT_s). \quad (9)$$

They may then be used to form the baseband composite signal $s_c(t)$ as $$s_c(t) = \frac{1}{\sqrt{M_c}} \cdot \sum_{m=1}^{M_c} s_m(t) \cdot e^{j(2\pi f_m t + \theta_m)}, \quad (10)$$

Where $\theta_m$ represents the normalized difference in signal carrier phase and $f_m$ is the mth-signal center frequency. For better utilization of bandwidth, the case of uniform spacing in frequency, say $\Delta f$, is considered but the techniques presented herein are applicable to any other frequency plan.

Figure 3:
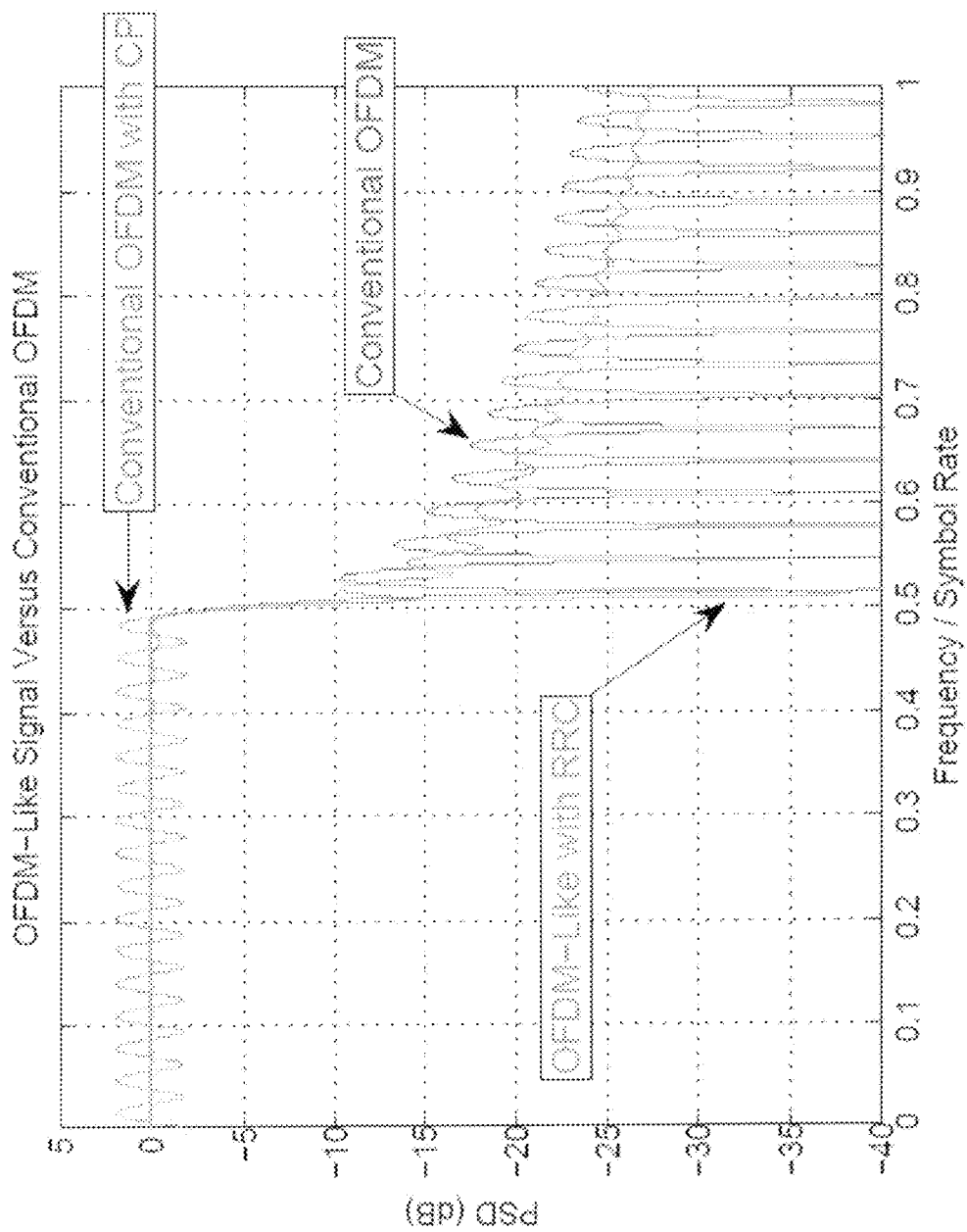
FIG. 3 is a power spectral density (PSD) plot illustrating the PSD in decibels as a function of the frequency/symbol rate of an individual pulse-shaped signal $s_m(t)$ of a conventional terrestrial OFDM, conventional terrestrial OFDM with a cyclic prefix (CP), and OFDM-like signaling using a RRC and 16APSK modulation in accordance with implementations described herein.

FIG. 3 is a power spectral density (PSD) plot illustrating the PSD in decibels as a function of the frequency/symbol rate of an individual pulse-shaped signal $s_m(t)$ of a conventional terrestrial OFDM, conventional terrestrial OFDM with a cyclic prefix (CP), and OFDM-like signaling using a RRC and 16APSK modulation in accordance with implementations described herein. As illustrated, the spectrum of conventional terrestrial OFDM exhibits a slowly decaying sin(x)/x behavior in the frequency domain. This is due to the rectangular pulse shaping utilized in conventional terrestrial OFDM. When a CP is present in conventional terrestrial OFDM, the spectrum exhibits large ripples (about 3.6 dB) in the in-band region. Spectral ripples require reducing the transmit power so as not to violate strict emission limits, set by regulatory bodies based on the peak level of the spectrum. By contrast, the spectrum associated with an OFDM-like signal in accordance with implementations described herein does not suffer from in-band ripples and has excellent containment of its frequency content within the frequency band of interest (i.e., a sharp frequency cutoff). The latter provides minimum levels of interference leaking into adjacent signals even if orthogonality amongst them is compromised due to different OFDM numerology or synchronization offsets. This also may ensure that the OOB emission level is consistent with that of a traditional satellite signal using single-carrier modulation (SCM).

In implementations such as the one illustrated by FIG. 3, the CP that repeats the last part of an OFDM symbol may be avoided. While using a CP may be advantageous in dispersive channels, it induces spectral efficiency loss due to redundancy, and causes energy loss as the CP symbols require additional energy to transmit, but are then discarded at the receiver. This energy loss is computed in decibel (dB) as $10 \cdot \log((N+N_{CP})/N)$, where $N_{CP}$ is the number of CP symbols. Also, as illustrated by FIG. 3, using CP creates prominent ripples in the in-band region of a conventional OFDM spectrum, requiring power reduction to ensure regulatory compliance. However, in some implementations, the techniques described herein may be applicable to the case of including CP when needed to remove inter-symbol interference encountered in frequency-selective multipath channels.

Satellite Transponder Model

Referring again to FIG. 1, the satellite transponder 200 that receives the composite signal $s_c(t)$ from an OFDM-like transmitter 100 includes an input multiplexing (IMUX) filter 210, a nonlinear amplifier 220, and an output multiplexing (OMUX) filter 230. The IMUX 210 may select a desired group of $M_c$ signals, thereby limiting the impact of adjacent uplink signals. Amplifier 220 may be a high-power amplifier (HPA) such as traveling-wave tube amplifier (TWTA), that amplifies its input signal at a back-off level that requires optimization. Following amplification, OMUX filter 230 is applied to limit nonlinear interference to adjacent transponders, and composite signal $s_{NL}(t)$ is output.

In implementations, the frequency responses associated with the IMUX and OMUX filters described herein may be taken from Fig. H7.4 of ETSI EN 302307-1, "Second generation framing structure, channel coding and modulation systems for broadcasting, interactive services, news gathering and other broadband satellite applications; Part I; DVB-S2," Digital Video Broadcasting (DVB), 2005, which is incorporated herein by reference. The frequency responses may be used with scaling formula $$R'(f) = R(f/M_c) \quad (11)$$

$$G'(f) = \frac{1}{M_c} \cdot G(f/M_c) \quad (12)$$

for cases when the number of signals $M_c$ exceeds unity, where R is the amplitude response, and G is the group delay response.

In implementations, the amplitude and phase distortions introduced by amplifier 220, in terms of amplitude modulation (AM)/AM and AM/phase modulation (PM) conversions, respectively, may be taken from Fig. H7.3 of ETSI EN 302307-1, "Second generation framing structure, channel coding and modulation systems for broadcasting, interactive services, news gathering and other broadband satellite applications; Part I; DVB-S2," Digital Video Broadcasting (DVB), 2005, which is incorporated herein by reference.

During downlink transmission from transponder 200 to OFDM-like receiver 300, the signal may be contaminated by downlink noise n(t) on the satellite channel such that the input to the receiver may be described by $r(t)=s_{NL}(t)+n(t)$. The downlink noise added by the satellite channel may be assumed as additive white Gaussian noise (AWGN) with single-sided PSD level of N0 (Watt/Hz), which corrupts the signal at the OMUX output. In implementations, the uplink noise may be assumed negligible relative to the downlink noise, a situation achieved through proper satellite link parameters including the size of the transmit antenna.

OFDM-Like Receiver

Figure 4:
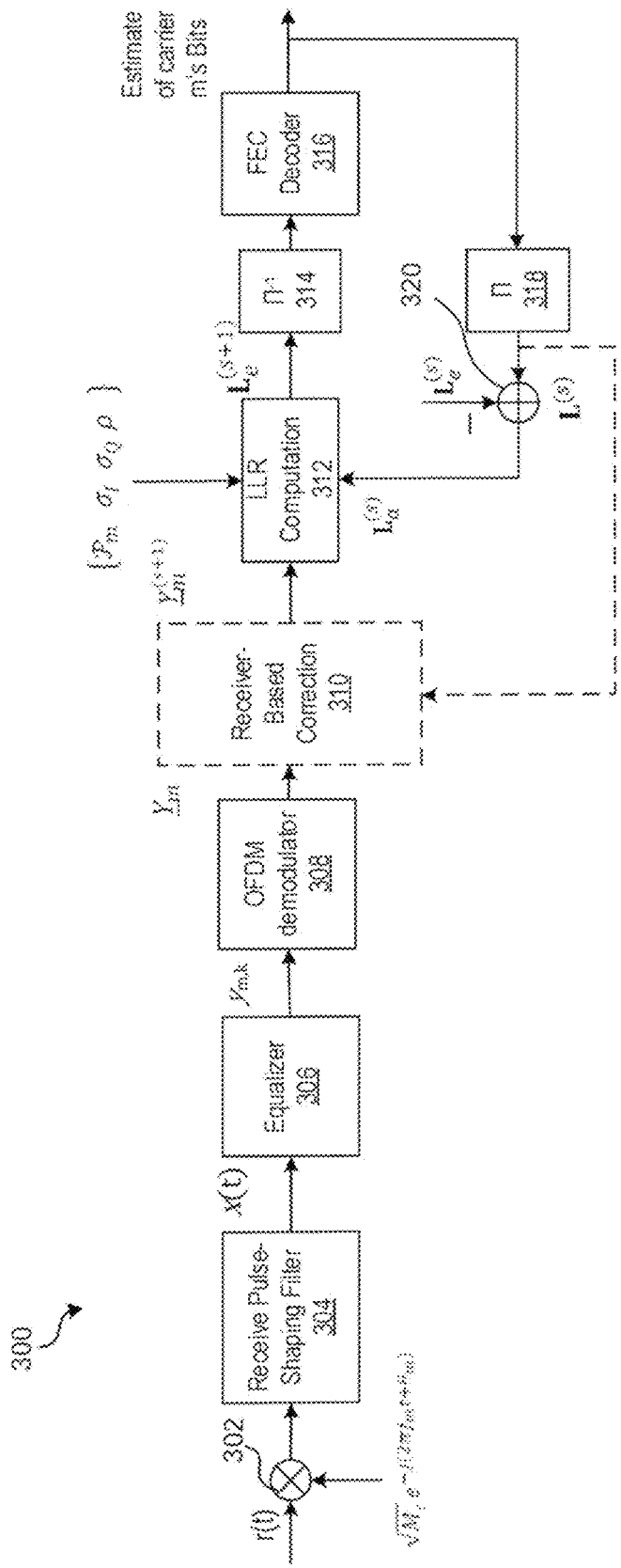
FIG. 4 is a block diagram illustrating one example implementation of an OFDM-like receiver that may be implemented to receive and process a downlink satellite signal on a carrier, modulated with multiple OFDM subcarriers, to output an estimate of the carrier's bits.

FIG. 4 is a block diagram illustrating one example implementation of an OFDM-like receiver 300 that may be implemented to receive and process a downlink satellite signal r(t) on a carrier m (e.g., signal coming from satellite transponder plus noise), modulated with multiple OFDM subcarriers, to output an estimate of the carrier m's bits. In the example of FIG. 4, single-user detection is applied, such that no information is exchanged with receivers of other users, as is typical in satellite forwarding applications. However, in other implementations, the design of receiver 300 may be adapted for multiple-user detection. For example, the receiver may instead receive a composite of multiple signals, in which case receiver-based distortion correction 310 may account for the non-linearities introduced by having multiple signals share the same satellite transponder.

Receiver 300 may include a mixer 302, a receive pulse-shaping filter 304, an equalizer 306, an OFDM demodulator 308, an optional receiver-based correction 310, a log-likelihood ratio (LLR) computation module 312, a de-interleaver 314, an FEC decoder 316, an interleaver 318, and a summer 320. As would be understood by one having ordinary skill in the art, in some embodiments other configurations of receiver 300 may be implemented, and one or more components of receiver 300 can be implemented in either digital form (e.g., as software running on a DSP or other processing device, with the addition of a DAC) or as analog components. Further, although receiver 300 is described with respect to exemplary mathematical implementations and constructions, it is not limited to these precise implementations and constructions.

Mixer 302 mixes the input waveform signal r(t) received from transponder 200 with a carrier down conversion signal from a local oscillator (not shown) to downconvert the received signal to baseband. Following the mathematical implementation from above, the carrier downconversion signal may take the form $\sqrt{M_c}e^{-j(2\pi f_m t+\theta_m)}$, where $f_m$ is the center frequency and $\theta_m$ is the carrier phase of the m-th channel.

At block 304, a receive pulse-shaping filter corresponding to (i.e., matched to) the transmit pulse-shaping filter 114 is applied to the downsampled carrier signal to generate an output signal x(t). For example, receive pulse-shaping filter 304 may take the form of an RRC receive filter matched to a transmit RRC filter. For example, following the mathematical implementation discussed above, the signal at the output of filter 304 may be expressed as $$x_m(t) = \sqrt{M_c} \cdot \int_{-\infty}^{\infty} r(t-\tau) \cdot e^{-j(2\pi f_m(t-\tau)+\theta_m)} \cdot p_{m,R}(\tau)d\tau, \quad (13)$$

Where $p_{m,R}(t)$ is the receive pulse shaping filter for a given carrier m, matched to the filter on the transmit side.

Equalizer 306 is configured to compensate for the linear phase distortion (i.e., group delay) introduced by the IMUX and OMUX filters of transponder 200. In various embodiments, output signal x(t) of filter 304 is downsampled by a downsampler (not shown) at multiples of the symbol rate (e.g., two samples per symbol), which allows for fractionally spaced (FS) group-delay (GD) equalization at equalizer 306. For example, following the mathematical implementation discussed above, at the output of equalizer 306 may be samples $\{y_{m,k}; k=0, 1, \ldots, N_f-1; m=1, 2, \ldots, M_c\}$, at the symbol rate.

The samples output by equalizer 306 may be segmented into $N_{OFDM}$ blocks of symbols, each containing N samples, and converted into a frequency domain by OFDM demodulator 308, which may perform the inverse operations of a transmit OFDM modulator 110. For example, OFDM demodulator 308 may be an FFT that converts the samples into the frequency domain, as $$\tilde{Y}_{m,l,n} = \frac{1}{\sqrt{N}} \cdot \sum_{k=0}^{N-1} y_{m,l \cdot N+k} \cdot e^{-j2\pi kn/N}, \quad (14)$$

for l=0, 1, . . . , $N_{OFDM}$−1, n=0, 1, . . . , N−1, and assembled back into vector of size $N_f \times 1$, per individual mth signal, as $$\underline{Y}_m = [\tilde{Y}_{m,0}^T, \tilde{Y}_{m,1}^T, \ldots, \tilde{Y}_{m,N_{OFDM}-1}^T]^T, \text{ where} \quad (15)$$

$$\tilde{Y}_{m,l} = [\tilde{Y}_{m,l,0}, \tilde{Y}_{m,l,1}, \ldots, \tilde{Y}_{m,l,N-1}]^T. \quad (16)$$

In an alternative implementation, the frequency-domain block of symbols $\tilde{Y}_{m,l}$ in (16) may generated by a matrix-vector multiplication as $$\tilde{Y}_{m,l} = F \cdot [y_{m,l \cdot N}, y_{m,l \cdot N+1}, \ldots, y_{m,(l+1) \cdot N+1}]^T. \quad (17)$$

As illustrated in FIG. 4, receiver 300 includes an LLR computation module 312 to compute the likelihood that particular symbols were transmitted by a transmitter 100. This likelihood may be iteratively improved and provided to an FEC decoder 316 to improve an estimate of the source bits that were received from a transmitter. During each iteration (if any), LLR computation module 312 also considers the a priori information on the code bits provided by FEC decoder 316 during a prior iteration.

In implementations, LLR computation module 312 may directly couple to the output of OFDM demodulator 308. Alternatively, it may couple to the output of optional receiver-based correction module 310. In implementations where a receiver-based correction module 310 is utilized, it may provide improved performance to receiver 300 by cancelling out signal distortion at the receiver, thereby improving the quality of the input to LLR computation module 312. In particular, as further described below, correction 310 may provide frequency-domain distortion cancellation, iteratively exchanging soft information with FEC decoders 316, to provide successively improved estimation of the transmitted symbols.

Referring again to the example mathematical implementation, discussed above, variables $\{Y_{m,n}; n=0, 1, \ldots, N_s-1; m=1, 2, \ldots, M_c\}$, the nth components of $\underline{Y}_m$ in (15), may be used to generate LLRs for individual FEC decoders after removal of extra ($N_f - N_s$) padded symbols. Alternatively, the receiver includes an option of implementing a frequency-domain successive compensator (e.g., receiver-based correction 310), further discussed below, using soft-information provided by the FEC decoder, over S iterations. In that case, a vector of frequency-domain samples at the output of the compensator during iteration s+1, denoted by $\underline{Y}_m^{(s+1)}$, may be used to generate LLRs for the FEC decoder. In generating the required LLR, the clustering and warping experienced by $Y_{m,n}$ due to the nonlinear distortion may be taken into account by receiver-based correction 310. This clustering can be different for symbols on different constellation rings and is non-circular, with some rotation, in which case a bivariate Gaussian model may be used for the evaluation of the LLRs. This may be used in conjunction with the principle of bit-interleaved coded modulation with iterative decoding, which involves exchange of soft information with the FEC decoder. More specifically, in the context of FIG. 4, the LLR computation module 312 may take as input as input $Y_{m,n}$ and $L_a^{(s)}$, the a priori information on the code bits provided by the FEC decoder 316 during the sth iteration. LLR computation module 312 may calculate the bit extrinsic information for the $\log_2 M$ bits that map to a particular symbol $X_{m,n}$ and can be expressed in terms of an LLR as $$L_e^{(s+1)}(b_{m,i}) = \log \frac{\sum_{\tilde{X} \in \chi_i^0} \exp\left\{f_{bi}(Y_{m,n} | \tilde{X}) + \sum_{\substack{j=1 \\ j \neq i}}^{\log_2 M} g_j(\tilde{X}) L_a^{(s)}(b_{m,j})\right\}}{\sum_{\tilde{X} \in \chi_i^1} \exp\left\{f_{bi}(Y_{m,n} | \tilde{X}) + \sum_{\substack{j=1 \\ j \neq i}}^{\log_2 M} g_j(\tilde{X}) L_a^{(s)}(b_{m,j})\right\}} \quad (18)$$

for the case of code bit $b_{m,i}$ corresponding to symbol $X_{m,n}$. In (18), $g_i(X_{m,n})$ is defined as a function returning the ith bit used to label $X_{m,n}$ such that i=1, 2, . . . , $\log_2 M$ and $f_{bi}(Y_{m,n}|\tilde{X})$ represents an improvement in evaluating the likelihood probability based on the bivariate Gaussian model, which is further described below. For the specific case of iteration s=0, no soft-information is available from the FEC decoder, so $L_a^{(0)}=0$ is used. The vector of extrinsic information $L_e^{(s+1)}$ may be provided as an input to the FEC decoder, after deinterleaving, and the decoder may generate an estimate of the source bits after a maximum number of iterations is reached.

Distortion Correction

As discussed above, a transmitter-based correction 112 or receiver-based correction 310 may be introduced to correct for linear and nonlinear distortion that results in a satellite communications system that uses OFDM-like signaling. This distortion correction may account for the linear and nonlinear distortion introduced by the HPA, the linear and nonlinear distortion caused by the interaction of the signals in the composite, the linear and nonlinear distortion caused by the interaction between OFDM subcarriers, and/or the linear and nonlinear distortion caused by inter-carrier interference. To this end, particular methods are described below for correcting for the nonlinear distortion resulting from sharing multiple OFDM-like signals through a single nonlinearity (e.g., amplifier 220). As further described below, a computationally efficient polyphase construction of the distortion may be implemented to provide for novel compensation methods that may be applied at an OFDM-like transmitter and/or OFDM-like receiver, entailing correction to successively minimize nonlinear distortion.

Distortion Construction

In accordance with implementations described herein, a nonlinear distortion construction in an OFDM-like satellite communication system may provide vectors containing estimates of the distorted symbols for a desired signal, in the frequency and time domains, resulting from sharing signals by a single nonlinearity such as a HPA of a satellite transponder.

As further described below, the determined distortion construction may provide vectors $\underline{H}_{m_d}^{(f)}(\Xi;M_c,L)$ and $\underline{H}_{m_d}^{(t)}(\underline{\xi};M_c,L)$ containing estimates of the distorted symbols for the desired $m_d$th signal, in the frequency and time domains, respectively, resulting from sharing $M_c$ signals by a single nonlinearity, for a given double-sided memory span L. The input vectors $\underline{\Xi}$ and $\underline{\xi}$ are related through the application of N-point IFFT on a per-block basis. More specifically, E may be composed by the stacking of inputs from $M_c$ signals, denoted as $$\Xi = \left[\hat{\Xi}_1^T, \hat{\Xi}_2^T, \ldots, \hat{\Xi}_{M_c}^T\right]^T, \quad (19)$$

where each individual vector is of size $$N_f \times 1 \text{ as } \hat{\Xi}_m = \left[\Xi_{m,0}, \Xi_{m,1}, \ldots, \Xi_{m,N_f-1}\right]^T.$$

Individual Vector $$\hat{\Xi}_m$$

may be segmented into $N_{OFDM}$ blocks, each with N symbols to modulate N orthogonal subcarriers in the frequency domain, where $N_{OFDM}$ is defined in (2). The vector $$\hat{\Xi}_m$$

can be formed by stacking vectors relating to blocks as $$\hat{\Xi}_m = \left[\hat{\Xi}_{m,0}^T, \hat{\Xi}_{m,1}^T, \ldots, \hat{\Xi}_{m,N_{OFDM}-1}^T\right]^T, \text{ where} \quad (20)$$

$$\hat{\Xi}_{m,l} = \left[\Xi_{m,l\cdot N}, \Xi_{m,l\cdot N+1}, \ldots, \Xi_{m,(l+1)\cdot N-1}\right]^T \quad (21)$$

is of size N×1, l=0, 1, . . . , $N_{OFDM}$−1 and m=1, 2, . . . , $M_c$. Each vector $$\hat{\Xi}_{m,l}$$

in (21) is further processed by an N-point IFFT to generate lth OFDM symbol as $$\xi_{m,l,k} = \frac{1}{\sqrt{N}} \cdot \sum_{n=0}^{N-1} \hat{\Xi}_{m,l,n} \cdot e^{j2\pi kn/N}, \quad (22)$$

where $$\hat{\Xi}_{m,l,n}$$

in (22) is the nth component of vector $$\hat{\Xi}_{m,l}$$

of (21) and k=0, 1, . . . , N−1. The components $\xi_{m,l,k}$ in (22) are stacked to form the input in the time domain as $$\tilde{\xi}_m = \left[\tilde{\xi}_{m,0}^T, \tilde{\xi}_{m,1}^T, \ldots, \tilde{\xi}_{m,N_{OFDM}-1}^T\right]^T, \quad (23)$$

where $$\tilde{\xi}_{m,l} = \left[\xi_{m,l,0}, \xi_{m,l,1}, \ldots, \xi_{m,l,N-1}\right]^T \quad (24)$$

is of size N×1. The vector is then formed by stacking $$\tilde{\xi}_m$$

of (23) across $M_c$ signals as $$\underline{\xi} = \left[\tilde{\xi}_1^T, \tilde{\xi}_2^T, \ldots, \tilde{\xi}_{M_c}^T\right]^T. \quad (24)$$

In implementations, a computationally efficient polyphase filter structure is utilized to implement the interpolating filter operation that provides oversampling of $N_{ss}$ samples per symbol, and models the cascade of the transmit pulse and the IMUX filter. Toward this, let $\breve{p}_{m,k}$, where m=1, 2, . . . , $M_c$, and k=0, 1, . . . , $N_{SS}$−1, be the set of filter coefficients representing the cascade of transmit filter $p_{m,T}$ and the IMUX model. Let $\breve{q}_{m,k}^{(l)}$ denote the arms of a polyphase filter bank, for l=0, 1, . . . , $N_{ss}$−1, associated with the mth signal, each arm operating at one sample per symbol, expressed as $$\breve{q}_{m,k}^{(l)} = \breve{p}_{m,k \cdot N_{ss}+l} \quad (26)$$

where k=0, 1, . . . , L−1. The filter bank in (26) is used to process the time-domain data $$\tilde{\xi}_{m,k},$$

contained in $$\tilde{\xi}_m$$

of (23), producing outputs $u_{m,k}^{(l)}$ as $$u_{m,k}^{(l)} = \sum_{i=0}^{L-1} \tilde{\xi}_{m,k-i} \cdot \bar{q}_{m,i}^{(l)}, \quad (27)$$

where k=0, 1, . . . , $N_f$–1. The desired interpolating filter output $b_{m,k}$ can then be supplied by the filter bank outputs in (27) through sequential interleaving, with frequency-translation to the respective center frequency of the mth signal, in the following manner $$b_{m,k} = u_{m,k'}^{(l')} \cdot e^{j\left(2\pi f_m \frac{k}{N_{ss}} T_s + \theta_m\right)}, \quad (28)$$

where l'=k(mod $N_{ss}$) and $$k' = \left\lfloor \frac{k}{N_{ss}} \right\rfloor,$$

for k=0, 1, . . . , $N_f \cdot N_{ss}$–1. The value $N_{ss}$ in (26)-(28) is preferably large enough to avoid the aliasing effect of distortion when $M_c$ signals share the same transponder.

The composite of $b_{m,k}$ in (28) may then be formed across signals and scaled to the correct input back-off (IBO) level of the HPA by multiplying by a real-valued parameter $\gamma_{IBO}$, to generate $\zeta_k$ $$\zeta_k = \gamma_{IBO} \cdot \sum_{m=1}^{M_c} b_{m,k}. \quad (29)$$

The AM/AM and AM/PM distortions may be computed based on the corresponding HPA's conversion model and applied to the samples $\zeta_k$ producing the distorted sample $\tilde{\zeta}_{m_d,k}$, including the frequency-translation to the desired $m_d$th signal whose distortion is being estimated. This is mathematically expressed as $$\tilde{\zeta}_{m_d,k} = \beta_{HPA}(|\zeta_k|) \cdot e^{j(\angle \zeta_k + \psi_{HPA}(|\zeta_k|))} \cdot e^{-j\left(2\pi f_{m_d} \frac{k}{N_{ss}} T_s + \theta_{m_d}\right)}, \quad (30)$$

where $|\zeta_k|$ and $\angle_{\zeta_k}$ are the amplitude and phase of the input $\zeta_k$, respectively, and $\beta_{HPA}(x)$ and $\psi_{HPA}(x)$ are the amplitude and phase distortions, respectively, of the HPA model.

Next may be replicated the impact of the cascade of OMUX, receive filter, and group-delay equalizer, appropriately decimated at the output to one sample per symbol. Toward this, the polyphase filter structure for computationally efficient implementation of decimation may be used. Let $\breve{p}_{m_d,k}$, where k=0, 1, . . . , $N_{SS} \cdot L$–1, denote the set of filter coefficients that represents the cascade of receive filter $p_{m_d,R}$, the OMUX model, and the group-delay equalizer. We further introduce $\breve{q}_{m_d,k}^{(l)}$, for l=0, 1, . . . , $N_{ss}$–1, as the arms of a polyphase filter bank, each arm operating at one sample per symbol, defined as $$\bar{\breve{q}}_{m_d,k}^{(l)} = \breve{p}_{m_d,k \cdot N_{ss}+l}, \quad (31)$$

where k=0, 1, . . . , L–1. The input to the filter bank of (31) is $\rho_{m_d,k}^{(l)}$, generated by delaying and decimating $\tilde{\lambda}_{m_d,k}$ of (30) as $$\rho_{m_d,k}^{(l)} = \tilde{\zeta}_{m_d,k \cdot N_{ss}-l}, \quad (32)$$

where k=0, 1, . . . , $N_f$–1. The desired decimating filter output $v_{m_d,k}$ can then be computed using the polyphase filter structure in (31)(32) by summing up across the outputs of the filter bank, or $$v_{m_d,k} = \sum_{l=0}^{N_{ss}-1} \left[ \sum_{i=0}^{L-1} \rho_{m_d,k-i}^{(l)} \cdot \bar{\breve{q}}_{m_d,i}^{(l)} \right]. \quad (33)$$

The output of the decimating filter in (33) may then be segmented into $N_{OFDM}$ blocks, each with N time-domain distorted symbols, and can be formed by stacking vectors relating to blocks as $$\underline{v}_{m_d} = \left[ \tilde{\underline{v}}_{m_d,0}^T, \tilde{\underline{v}}_{m_d,1}^T, \ldots, \tilde{\underline{v}}_{m_d,N_{OFDM}-1}^T \right]^T, \quad (34)$$

where $$\tilde{\underline{v}}_{m_d,l} = \left[ v_{m_d,l \cdot N}, v_{m_d,l \cdot N+1}, \ldots, v_{m_d,(l+1) \cdot N-1} \right]^T \quad (35)$$

is of size N×1 and l=0, 1, . . . , $N_{OFDM}$–1. Each vector $\tilde{\underline{v}}_{m_d,l}$ in (35) can be further processed by an N-point FFT to produce the distorted symbols in the frequency domain as $$\tilde{Y}_{m_d,l,n} = \frac{1}{\sqrt{N}} \cdot \sum_{k=0}^{N-1} \tilde{v}_{m_d,l,k} \cdot e^{-j2\pi kn/N}, \quad (36)$$

where $\tilde{v}_{m_d,l}$ in (36) is the kth component of vector $\tilde{\underline{v}}_{m_d,l}$ in (35) and n=0, 1, . . . , N–1. The set of distorted symbols $\tilde{Y}_{m_d,l,n}$ of (36) are collected per block as $$\tilde{\underline{Y}}_{m_d,l} = \left[ \tilde{Y}_{m_d,l,0}, \tilde{Y}_{m_d,l,1}, \ldots, \tilde{Y}_{m_d,l,N-1} \right]^T, \quad (37)$$

and the contributions from all the OFDM blocks, $\tilde{\underline{Y}}_{m_d,l}$ in (37), can be stacked to form $\underline{Y}_{m_d}$ as $$\underline{Y}_{m_d} = \left[ \tilde{\underline{Y}}_{m_d,0}^T, \tilde{\underline{Y}}_{m_d,1}^T, \ldots, \tilde{\underline{Y}}_{m_d,N_{OFDM}-1}^T \right]^T. \quad (38)$$

In this implementation, the vector of time-domain distorted symbols $\underline{H}_{m_d}^{(t)}(\Xi;M_c,L)$ of size $N_f \times 1$ is equal to the vector of the decimating filter output $\underline{v}_{m_d}$ of (34) or $$\underline{H}_{m_d}^{(t)}(\Xi;M_c,L) = \underline{v}_{m_d}, \quad (39)$$

whereas the vector of frequency-domain distorted symbols $\underline{H}_{m_d}^{(f)}(\Xi;M_c,L)$, of size $N_f \times 1$, is equal to the vector of the N-point FFT blocks $\underline{Y}_{m_d}$ of (38) or $$\underline{H}_{m_d}^{(f)}(\Xi;M_c,L) = \underline{Y}_{m_d}. \quad (40)$$

Figure 5:
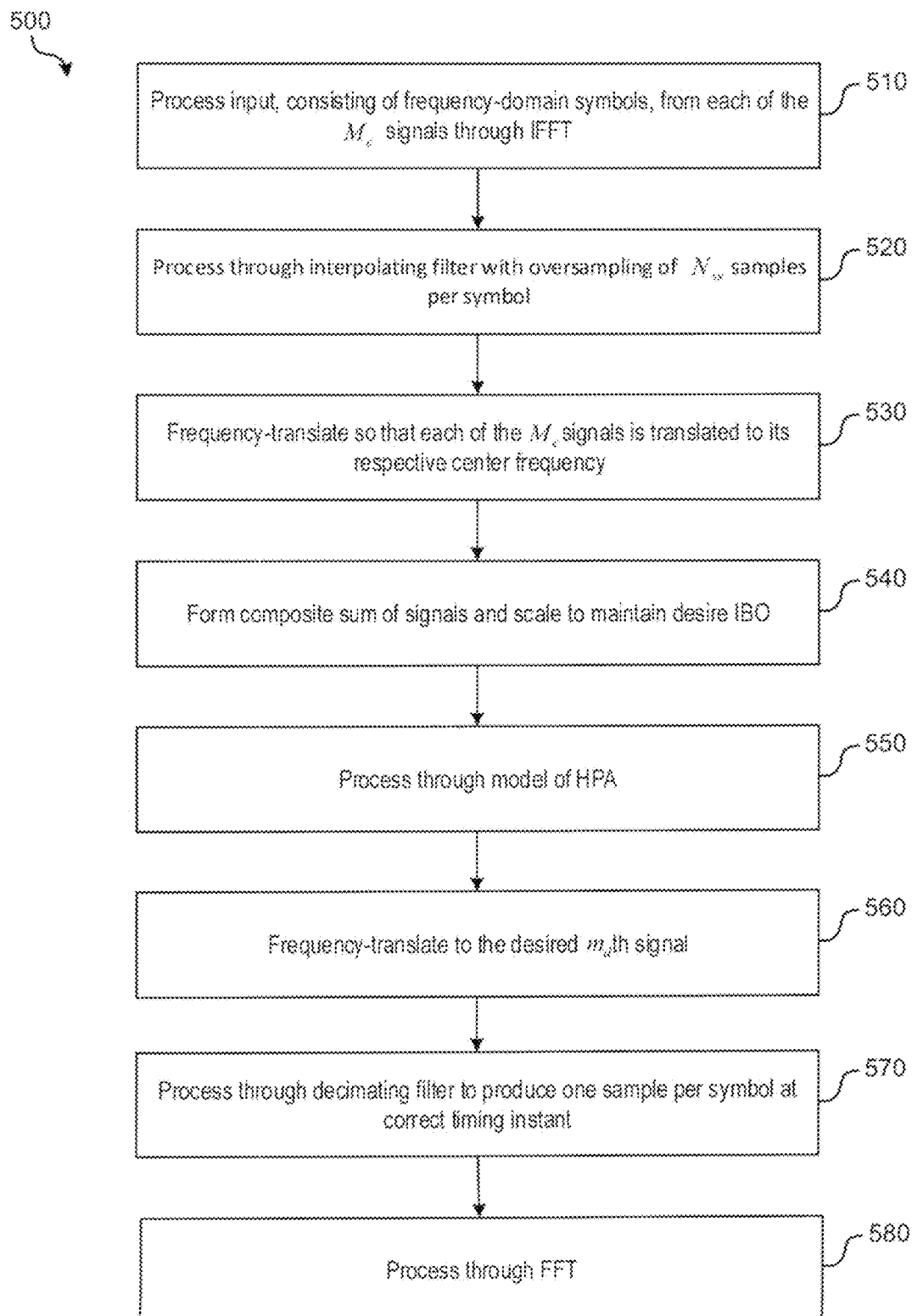
FIG. 5 is an operational flow diagram illustrating an example method of creating a frequency-domain distortion construction that may be used by a transmitter-based correction module and/or receiver-based correction module to correct for distortion in accordance with implementations.

FIG. 5 is an operational flow diagram illustrating an example method 500 of creating a frequency-domain distortion construction (e.g., $\underline{H}_{m_d}^{(f)}(\Xi;M_c,L)$) that may be used by transmitter-based correction 112 and/or receiver-based correction 310 to correct for distortion in accordance with implementations. It should be noted that although method 500 is annotated with exemplary variables and functions that may be utilized in particular mathematical implementations, described above with reference to Equations (19)-(38), method 500 is not limited to these particular mathematical implementations.

At operation 510, an input, consisting of frequency-domain symbols received from the output of an IFFT for each signal $M_c$ may be processed. For example, the input may be processed in accordance with equations (19)-(25). At operation 520, the output of operation 510 may processed through an interpolating filter with an oversampling of $N_{ss}$ samples per symbol. For example, operation 520 may be implemented in accordance with equations (26)-(27). At operation 530, the output of operation 520 may be frequency translated such that each of the $M_c$ signals is translated to its respective center frequency. For example, operation 530 may be implemented in accordance with equation (28).

At operation 540, a composite sum of the signals may be formed and scaled to maintained a desired IBO of a HPA. For example, operation 540 may be implemented in accordance with equation (29). At operation 550, the composite sum may be processed through a model of the HPA. For example, operation 550 may be implemented in accordance with equation (30). At operation 560, the output of operation 550 may be translated to the desired $m_d$th signal. At operation 570, the output of operation 560 may be processed through a decimating filter to produce one sample per symbol at a correct timing instant. For example, operation 570 may be implemented in accordance with equations (31)-(33). At operation 580, the output of the decimating filter may be segmented into a plurality of OFDM blocks and processed using a FFT. For example, operation 580 may be implemented in accordance with equations (34)-(38).

Figure 6:
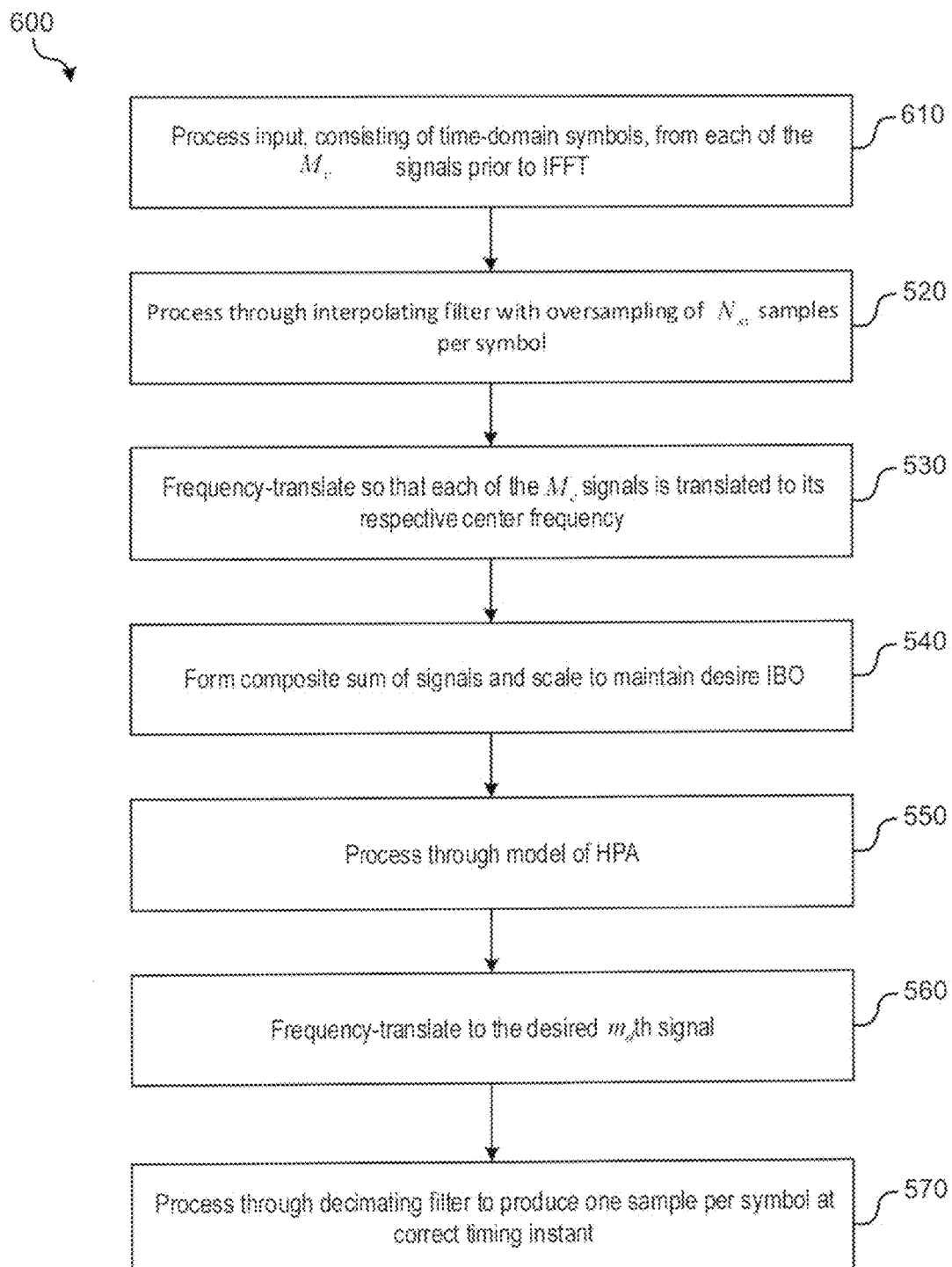
FIG. 6 is an operational flow diagram illustrating an example method of creating a time-domain distortion construction that may be used by transmitter-based correction module and/or receiver-based correction module to correct for distortion in accordance with implementations.

FIG. 6 is an operational flow diagram illustrating an example method 600 of creating a time-domain distortion construction (e.g., $\underline{H}_{m_d}^{(t)}(\underline{\xi};M_c,L)$) that may be used by transmitter-based correction 112 and/or receiver-based correction 310 to correct for distortion in accordance with implementations. As illustrated, method 600 may be implemented similarly to method 500 except that the input in this case is an input of time-domain symbols, for each signal $M_c$ prior to being processed by an IFFT. Additionally, method 600 does not require performing operation 580.

Transmitter-Based Correction

In implementations, a transmitter-based correction 112 may take the form of data predistortion that entails the successive updating of a vector of input symbols to drive the distortion vector toward zero. This data predistortion may be implemented at the symbol rate and may be placed before the transmit filters 114.

By way of mathematical example, Let $\underline{x}_m^{(s)}$ be the vector of complex-valued time-domain data symbols, namely, following the OFDM modulator 110 in FIG. 2, associated with the mth-signal at the sth-stage as $$\underline{x}_m^{(s)} = [x_{m,0}^{(s)}, x_{m,1}^{(s)}, \ldots, x_{m,N_f-1}^{(s)}]^T, \tag{41}$$

where s=0, 1, . . . , S−1 and m=1, 2, . . . , $M_c$. Also define the augmented input vector from the $M_c$ signals participating in the correction as $$\underline{\xi}^{(s)} = \begin{bmatrix} \underline{x}_1^{(s)} \\ \underline{x}_2^{(s)} \\ \vdots \\ \underline{x}_{M_c}^{(s)} \end{bmatrix}. \tag{42}$$

The input from the previous stage $\underline{x}_{m_d}^{(s)}$ may be updated by a recursion that is intended for finding zero-crossing of an unknown function when only its noisy measurements are available as $$\underline{x}_{m_d}^{(s+1)} = \underline{x}_{m_d}^{(s)} + \mu^{(s)} \cdot \underline{e}_{m_d}^{(Tx)}(\underline{\xi}^{(s)}), \tag{43}$$

where $\{\mu^{(s)}\}$ is a step-size sequence satisfying certain conditions, including being positive and decreasing, to ensure progress toward a solution. The choice of step-size sequence $\{\mu^{(s)}\}$ can be made to achieve a good compromise between convergence speed and amount of residual error. For initialization, the input to the zeroth-stage may use the undistorted vector of time-domain data symbols, or $\underline{x}_{m_d}^{(0)} = \underline{x}_{m_d}$.

In (43), $\underline{e}_{m_d}^{(Tx)}(\underline{\xi}^{(s)})$ is the time-domain error vector that incorporates the distortion within the $m_d$th signal itself and the other $M_c$−1 signals sharing the nonlinearity. More specifically, it can be mathematically described as the difference between the undistorted vector of symbols $\underline{x}_{m_d}$ and its distorted version, constructed through $\underline{H}_{m_d}^{(t)}(\underline{\xi}^{(s)};M_c,L)$, as discussed above, or $$\underline{e}_{m_d}^{(Tx)}(\underline{\xi}^{(s)}) = \underline{x}_{m_d} - \lambda_{m_d}^{-1} \cdot \underline{H}_{m_d}^{(t)}(\underline{\xi}^{(s)};M_c,L), \tag{44}$$

where $\lambda_{m_d}$ is a complex-valued gain correction aimed at removing the warping effect caused by the nonlinear distortion, obtained by $$\lambda_{m_d} = \frac{\underline{H}_{m_d}^{(t)}(\underline{\xi}^{(s)};M_c,L)^T \cdot \underline{x}_{m_d}^*}{\underline{x}_{m_d}^T \cdot \underline{x}_{m_d}^*}. \tag{45}$$

In an alternative implementation, the data predistortion can be implemented in the frequency domain (e.g., preceding the OFDM modulator 110 in FIG. 2). For this case, the recursion to update the data symbols may be $$\underline{X}_{m_d}^{(s+1)} = \underline{X}_{m_d}^{(s)} + \mu^{(s)} \cdot \underline{E}_{m_d}^{(Tx)}(\underline{\Xi}^{(s)}), \tag{46}$$

where $\underline{\Xi}^{(s)}$ is composed by stacking the predistorted frequency-domain symbols during the sth-stage from the $M_c$ signals, or $$\underline{\Xi}^{(s)} = \begin{bmatrix} \underline{X}_1^{(s)} \\ \underline{X}_2^{(s)} \\ \vdots \\ \underline{X}_{M_c}^{(s)} \end{bmatrix} \text{ and} \tag{47}$$

$$\underline{X}_m^{(s)} = [X_{m,0}^{(s)}, X_{m,1}^{(s)}, \ldots, X_{m,N_f-1}^{(s)}]^T. \tag{48}$$

For initialization, the zeroth-stage may use the undistorted vector of frequency-domain data symbols, or $\underline{X}_{m_d}^{(0)} = \underline{X}_{m_d}$. In (46), the error to be driven toward zero is computed using the frequency-domain construction $\underline{H}_{m_d}^{(f)}(\underline{\Xi}^{(s)};M_c,L)$ as $$\underline{E}_{m_d}^{(Tx)}(\underline{\Xi}^{(s)}) = \underline{X}_{m_d} - \lambda_{m_d}^{-1} \underline{H}_{m_d}^{(f)}(\underline{\Xi}^{(s)};M_c,L) \tag{49}$$

where $\mu_{m_d}$ is a complex-valued gain correction computed as $$\lambda_{m_d} = \frac{\underline{H}_{m_d}^{(f)}(\underline{\Xi}^{(s)};M_c,L)^T \cdot \underline{X}_{m_d}^*}{\underline{X}_{m_d}^T \cdot \underline{X}_{m_d}^*}. \quad (50)$$

Figure 7:
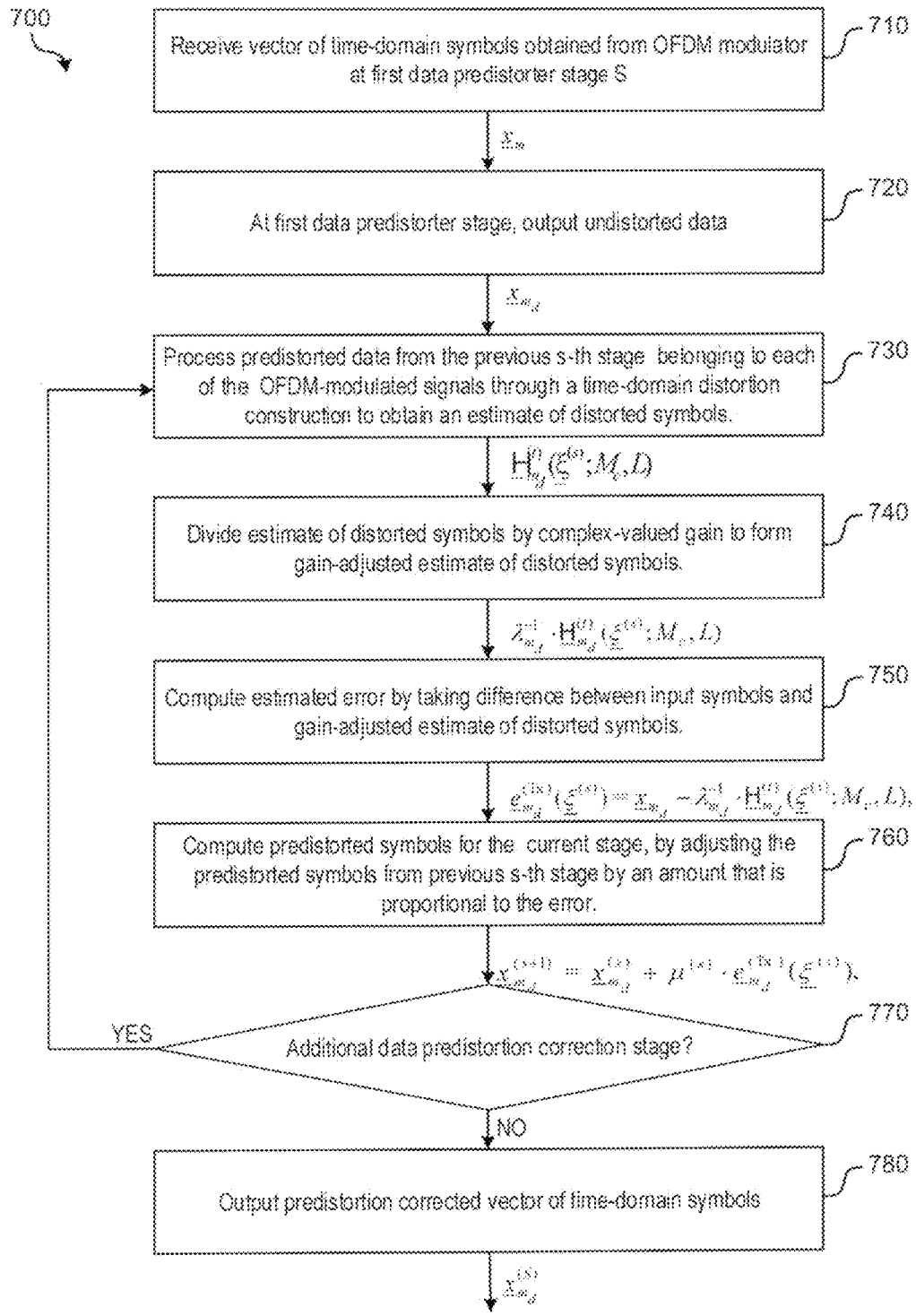
FIG. 7 is an operational flow diagram illustrating an example method of using a transmitter-based correction to apply transmitter data predistortion to an OFDM-like transmission channel in accordance with implementations.

FIG. 7 is an operational flow diagram illustrating an example method 700 of using a transmitter-based correction 112 to apply transmitter data predistortion to an OFDM-like transmission channel in accordance with implementations. It should be noted that although method 700 is annotated with exemplary variables and functions that may be utilized in particular mathematical implementations, described above with reference to Equations (41)-(50), method 700 is not limited to these particular mathematical implementations.

At operation 710, a vector of time-domain symbols output by an OFDM modulator (e.g., OFDM modulator 110) is received as an input at a first data predistorter stage. For example, the input vector of time-domain symbols may be an output $\underline{x}_m$ of an IFFT modulator. At operation 720, the first data predistortion stage outputs the received vector undistorted. For example, the vector $\underline{x}_{m_d}$ may be output.

At operations 730-760, subsequent data predistortion stages may be iterated as follows. At operation 730, the predistorted data from the previous s-th stage (not predistorted if previous stage is s=0) belonging to each of the OFDM-modulated signals is processed through a time-domain distortion construction to obtain an estimate of distorted symbols. For example, the predistorted data from the previous s-th stage $\underline{x}_{m_d}^{(s)}$ belonging to each of the $M_c$ signals may be processed through the time-domain distortion construction $\underline{H}_{m_d}^{(t)}$, discussed above, to obtain an estimate of distorted symbols that accounts for the distortion of the $m_d$th signal itself and the other $M_c$-1 signals sharing the nonlinearity.

At operation 740, the estimate of the distorted symbols may be divided by a complex-valued again to form a gain-adjusted estimate of the distorted symbols. For example, the output of operation 730 may be divided by complex-valued gain $\lambda_{m_d}$, discussed above with reference to Equation (45), to remove any warping effect caused by nonlinear distortion. At operation 750, an estimated error may be computed by taking the difference between the input symbols (ideal data) and the gain-adjusted estimate calculated at operation 740. For example, operation 750 may be implemented in accordance with equation (44). At operation 760, the predistorted symbols for the current stage are computed by adjusting the predistorted symbols from the previous stage by an amount proportional to the error computed at operation 750. For example, operation 760 may be implemented in accordance with equation (43).

At decision 770, it is determined if there is another predistortion correction stage iteration. If there is, operations 730-760 may be repeated. Otherwise, at operation 780, the predistortion corrected vector of time-domain symbols (e.g., $\underline{x}_{m_d}^{(S)}$ is output.

Receiver-Based Correction

In implementations, a receiver-based correction 310 may take the form of frequency-domain distortion cancellation, iteratively exchanging soft information with FEC decoders 316, to provide a successively improved estimation of the transmitted symbols.

By way of mathematical example, the estimate of the nonlinear distortion that achieves minimum mean-square error (MMSE) can be represented as $$\underline{E}_{m_d}^{(Rx)}(L^{(s)}) = \mathbb{E}\{\underline{H}_{m_d}^{(f)}(\underline{\Xi};M_c,L)|L^{(s)}\} - \mathbb{E}\{\underline{P}_{m_d}^{(s=0)}|L^{(s)}\}, \quad (51)$$

where $(\underline{\Xi};M_c,L)$ is the vector containing the undistorted data symbols $\{X_{m,n}\}$ from $M_c$ signals as defined in (47), and $L^{(s)}$ denotes the LLRs on the code bits associated with all users as provided by their respective FEC decoders, after interleaving, in the previous iteration. Also, $\underline{P}_{m_d}^{(s=0)}$ is a vector of centroids of the frequency-domain received samples $\underline{Y}_{m_d}$, associated with one of M possible values of the transmitted constellation symbols. The first expectation operation in (51) may be evaluated using the multicarrier Volterra formulation of B. F. Beidas, "Intermodulation distortion in multicarrier satellite systems: Analysis and turbo Volterra equalization," IEEE Trans. Commun., vol. 59, no. 6, pp. 1580-1590, June 2011, as it would be intrinsically linear in terms of its input vector.

The case of single-user detection at the receiver (consistent with satellite broadband system transmission in the forward direction) is now considered. In this case, no information exchange occurs between user terminals sharing a transponder, only distortion from the OFDM subcarriers within the $m_d$th signal itself is incorporated. Further, a simplifying assumption may be made processing soft symbols through the distortion constructor $\underline{H}_{m_d}^{(f)}$, i.e., moving the expectations to its input. Instead of (51), this simplified distortion estimation may be mathematically described by $$\underline{E}_{m_d}^{(Rx)}(L^{(s)}) = \underline{H}_{m_d}^{(f)}(\mathbb{E}\{\underline{X}_{m_d}|L^{(s)}\};1,L) - \mathbb{E}\{\underline{P}_{m_d}^{(s=0)}|L^{(s)}\}, \quad (52)$$

Where the second argument of the distortion constructor function $\underline{H}_{m_d}^{(f)}$ is set to unity to realize single-user detection at the receiver. In (52), the components of the expectation $\mathbb{E}\{\underline{X}_{m_d}|L^{(s)}\}$ may be computed using the expression $$\mathbb{E}\{X_{m_d,n}|L^{(s)}\} = \sum_{l=1}^M X_l \cdot P\{X_{m_d,n} = X_l|L^{(s)}\}, \quad (53)$$

where the conditional symbol probability $P\{X_{m_d,n}=X_l|L^{(s)}\}$ is obtained by converting the bit-wise LLRs into symbol probabilities, at the sth-stage, using the bit-to-symbol labelling chosen for the constellation. The LLR computation module described above with reference to the receiver may take as input $\underline{\tilde{Y}}_{m_d}^{(s)}$ and $L_a^{(s)}$ to generate extrinsic likelihoods for the code bits using (18). The soft distortion cancellation technique implements subtraction of the distortion estimate $\underline{E}_{m_d}^{(Rx)}(\underline{\Xi}^{(s)})$, in an iterative framework, such that at iteration s+1, $$\underline{\tilde{Y}}_{m_d}^{(s+1)} = \underline{Y}_{m_d} - \underline{E}_{m_d}^{(Rx)}(L^{(s)}). \quad (54)$$

In implementations, the evaluation of the likelihoods in (18) may be improved by taking into account the clustering and warping induced by the nonlinear distortion. More specifically, a bivariate Gaussian model may be used. To this end, the conditional probability expression for a particular constellation point $X^{(k)}$, k=1, 2, ..., M, expressed in the log-domain, may be $$f_{bi}(Y_{m_d}^{(s+1)} | X^{(k)}) = \quad (55)$$

$$\left\{\frac{-1}{2(1-\rho^{(k,s+1)^2})} \cdot \left[\left[\frac{\Re(Y_{m_d}^{(s+1)} - P^{(k,s+1)})}{\sigma_I^{(k,s+1)}}\right]^2 + \left[\frac{\Im(Y_{m_d}^{(s+1)} - P^{(k,s+1)})}{\sigma_Q^{(k,s+1)}}\right]^2 - 2\rho^{(k,s+1)}\frac{\Re(Y_{m_d}^{(s+1)} - P^{(k,s+1)})\Im(Y_{m_d}^{(s+1)} - P^{(k,s+1)})}{\sigma_I^{(k,s+1)}\sigma_Q^{(k,s+1)}}\right]\right\},$$

where the centroids $P^{(k,s+1)}$, standard deviations $\sigma_I^{(k,s+1)}$, $\sigma_Q^{(k,s+1)}$, and correlation coefficient $\rho^{(k,s+1)}$, associated with the kth constellation point, are computed during training mode. The extrinsic information for the code bits $L_e^{(s+1)}$ can be found using $f_{bi}(\tilde{Y}_{m_d}^{(s+1)}|X^{(k)})$ of (55) in (18), and is provided as input to the FEC decoder. For initialization, the expectations $\mathbb{E}\{\underline{X}_{m_d}|L^{(S)}\}$ during the zeroth-stage are replaced by symbol hard decisions obtained relative to $P^{(s=0)}$ in the decision metric instead of the nominal signal constellation.

Figure 8:
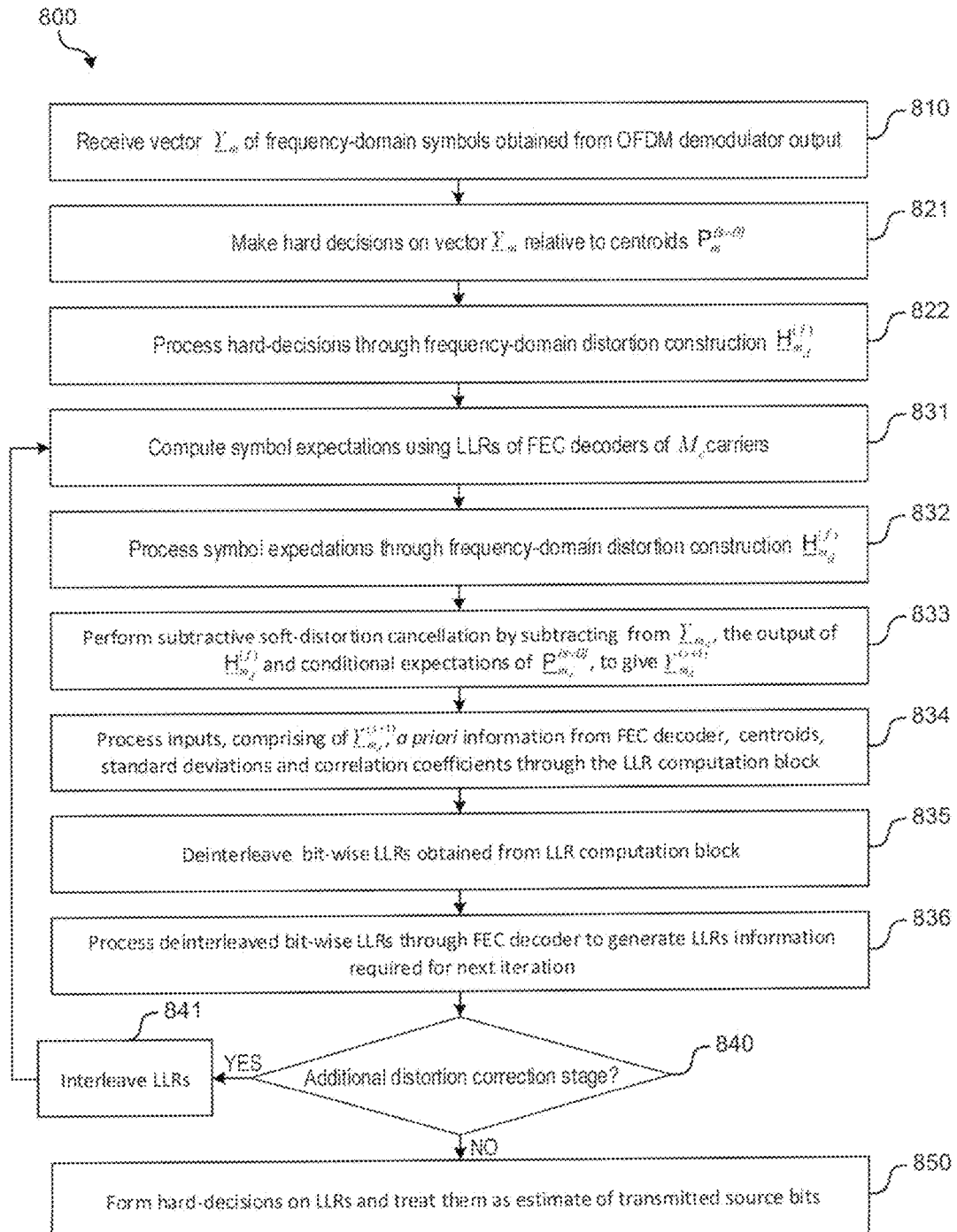
FIG. 8 is an operational flow diagram illustrating an example method of using a receiver-based correction in combination with LLR computation blocks to apply receiver-based soft distortion correction at a receiver to an OFDM-like channel in accordance with implementations.

FIG. 8 is an operational flow diagram illustrating an example method 800 of using a receiver-based correction 310 in combination with LLR computation blocks to apply receiver-based soft distortion correction at the receiver to an OFDM-like channel in accordance with implementations. It should be noted that although method 800 is discussed in the context of exemplary variables and functions that may be utilized in particular mathematical implementations, described above with reference to Equations (51)-(55), method 800 is not limited to these particular mathematical implementations.

At operation 810, the vector of frequency-domain symbols obtained from the receiver FFT block, $\underline{Y}_m$, where m=1, 2, ... $M_c$, is received as an input. At operation operations 821-822, for the initial receiver correction iteration (e.g., s=0), make hard-decisions on $\underline{Y}_m$ relative to centroids $P_m^{(s=0)}$ (operation 821) and process hard-decisions through the distortion construction $\underline{H}_{m_d}^{(f)}$ (operation 822). For subsequent receiver correction iterations (e.g., s>0), operations 831-836 may be implemented. At operation 831, compute symbol expectations using LLRs provided by the FEC decoders of $M_c$ carriers. At operation 832, process symbol expectations through the distortion constructor $\underline{H}_{m_d}^{(f)}$. At operation 833, perform subtractive soft-distortion cancellation by subtracting from $\underline{Y}_{m_d}$, the output of $\underline{H}_{m_d}^{(f)}$ and conditional expectations of $\underline{\mathcal{P}}_{m_d}^{(s=0)}$, to give $\underline{Y}_{m_d}^{(s+1)}$. At operation 834, process inputs, comprising of $\underline{Y}_{m_d}^{(s+1)}$, a priori information from FEC decoder, centroids, standard deviations and correlation coefficients through the LLR computation block. At operation 835, deinterleave bit-wise LLRs obtained from the LLR computation block. At operation 836, process deinterleaved bit-wise LLRs through FEC decoder to generate LLRs information required for next iteration.

At decision 840, it is determined if there is additional distortion correction stage. If there is, at operation the generated LLRs may be interleaved and operations 831-836 may be repeated. Otherwise, at operation 850, hard-decisions may be formed on the LLRs, which may be treated as an estimate of the transmitted source bits.

EXPERIMENTAL RESULTS

The performance of implementations of the OFDM signaling techniques described herein were tested. To this end, a simulation setup was implemented that considered the example OFDM-like signaling satellite communication illustrated by FIGS. 1-4 and the nonlinear distortion correction using successive compensation techniques discussed above.

As in a mass-efficient broadband system, the scenario of operating the satellite transponder in a multicarrier mode where $M_c$ independent signals share a single nonlinear transponder was considered. Results described herein are reported for the specific cases of $M_c=1$ and $M_c=3$. For each individual signal into the transponder, the tested OFDM-like signaling used N-point IFFT and N-point FFT, at the transmitter and receiver, respectively, where N=32. Filters with RRC shaping and rolloff of 0.05 were applied on each signal at the transmitter, $p_{m,T}(t)$, and for matched filtering at the receiver, $p_{m,R}(t)$. The per-signal symbol rate was 37 Baud, with uniform carrier spacing of $\Delta f=40$ MHz when $M_c=3$. A considered constellation was 16APSK with bit-to-symbol labeling as defined in the satellite standard ETSI EN 302307-1, "Second generation framing structure, channel coding and modulation systems for broadcasting, interactive services, news gathering and other broadband satellite applications; Part I; DVB-S2," *Digital Video Broadcasting (DVB)*, 2005, which is incorporated by reference. Another considered constellation was 64APSK with bit-to-symbol labeling as defined in the satellite standard ETSI EN 302307-2, "Second generation framing structure, channel coding and modulation systems for broadcasting, interactive services, news gathering and other broadband satellite applications; Part II; S2 Extensions (DVB-S2X)," *Digital Video Broadcasting (DVB)*, March 2014, which is incorporated herein by reference.

During testing, the operating level of the HPA of the satellite transponder was expressed in terms of OBO for a modulated carrier as measured at its output. The computationally efficient module of the nonlinear distortion construction $\underline{\mathcal{H}}_{m_d}^{(f)}(\underline{\Xi}; M_c, L)$ or $\underline{\mathcal{H}}_{m_d}^{(f)}(\underline{\Xi}; M_c, L)$, discussed above, was used with a memory span set as L=16, with an oversampling factor internally set at $N_{ss}=8$. Both, the successive multicarrier data predistortion technique and the successive signal predistortion technique implemented S=10 stages of successive distortion cancellation. Ideal receiver synchronization was assumed for all simulations.

Six different compensation strategies for the OFDM-like signaling system were evaluated:

1) An enhanced receiver architecture from ETSI TR 102 376 VI. 1.1, "Implementation guidelines for the second generation system for broadcasting, interactive services, news gathering and other broadband satellite applications; Part 2: S2 Extensions DVB-S2X," Digital Video Broadcasting (DVB), 2015, using fractionally spaced linear equalizer whose taps are computed using the least-mean squares (LMS) adaptation algorithm;
2) Iterative receiver-based nonlinear distortion cancellation employing hard symbol decisions to recreate the distortion and a single gain correction applied at the output of the FFT operator; (referred to in FIGS. 9-12 as "OFDM-Based Rx Hard IC");
3) Successive signal predistortion applied on the signal composite $s_c(t)$, as described in B. F. Beidas, "Adaptive digital signal predistortion for nonlinear communication systems using successive methods," *IEEE Trans. Commun.*, vol. 64, no. 5, pp. 2166-2175, May 2016 (referred to in FIGS. 6-8 as "OFDM-Based: Signal PD" and FIGS. 9-12 as "OFDM-Based: Tx Signal PD");
4) The receiver-based successive soft cancellation that uses centroids and bivariate Gaussian statistics, as described herein (referred to in FIGS. 9-12 as "OFDM-Based Rx Soft IC");
5) Successive data predistortion applied at the symbol rate prior to transmit filters, as described herein (referred to in FIGS. 6-8 as "OFDM-Based: Data PD" and FIGS. 9-12 as "OFDM-Based: Tx Data PD"); and
6) Combined transmitter-based data predistortion with receiver-based soft cancellation, as described herein (referred to in FIGS. 10-12 as "OFDM-Based: PD and Soft IC").

Performance comparisons were also made with a traditional system employing single carrier modulation (SCM)-based signaling, along with the enhanced receiver architecture from ETSI TR 102 376 VI. 1.1, "Implementation guidelines for the second generation system for broadcasting, interactive services, news gathering and other broadband satellite applications; Part 2: S2 Extensions DVB-S2X," *Digital Video Broadcasting* (*DVB*), 2015, while also taking advantage of the centroid-based calculations of the bivariate Gaussian function, described herein.

Figure 9A:
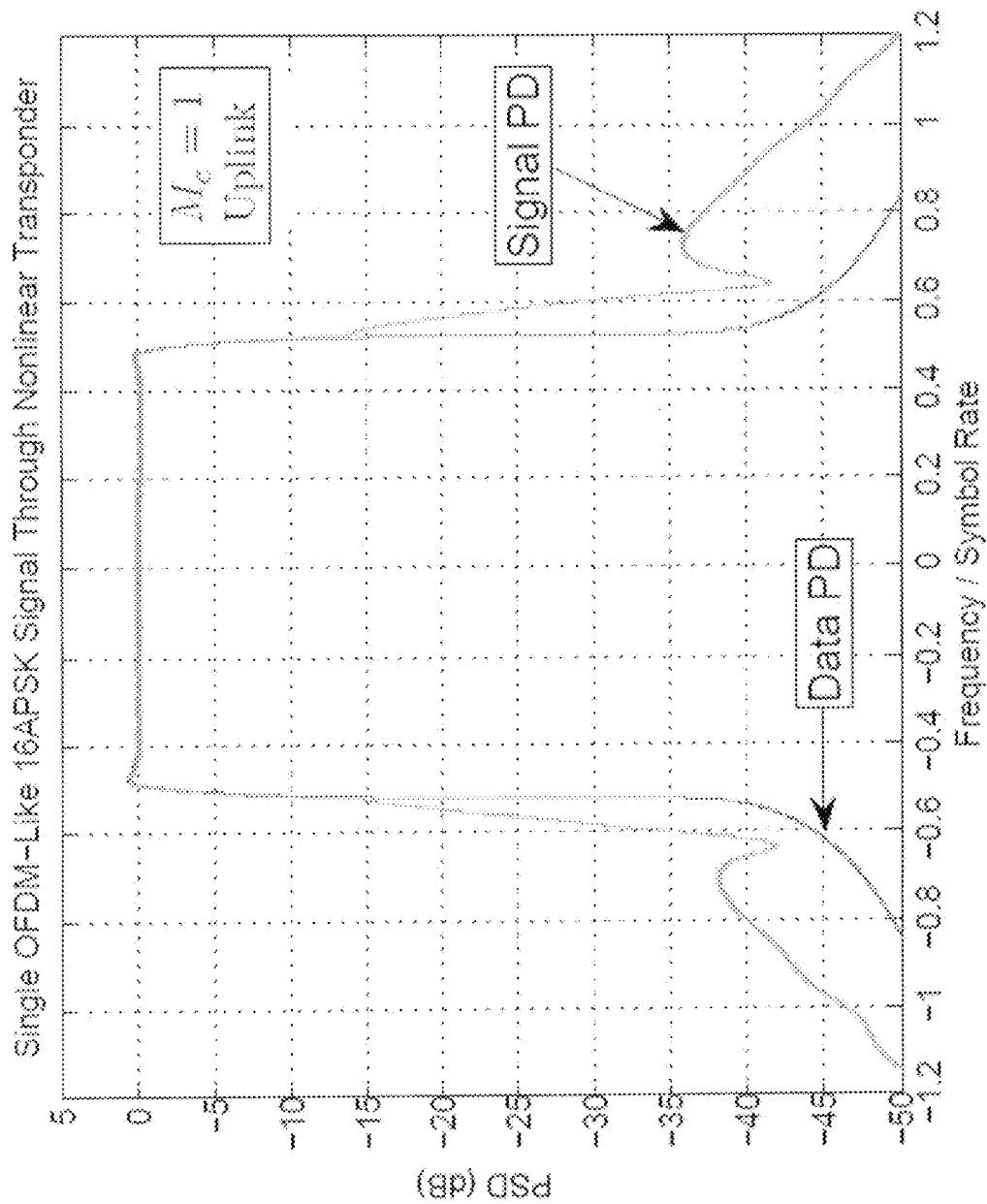
FIG. 9A is a PSD plot illustrating an uplink PSD in decibels as a function of the frequency/symbol rate at an optimal OBO level when applying a signal predistortion compensation scheme versus a data predistortion compensation scheme to an OFDM-like signal modulated using the 16APSK signal constellation.
Figure 9B:
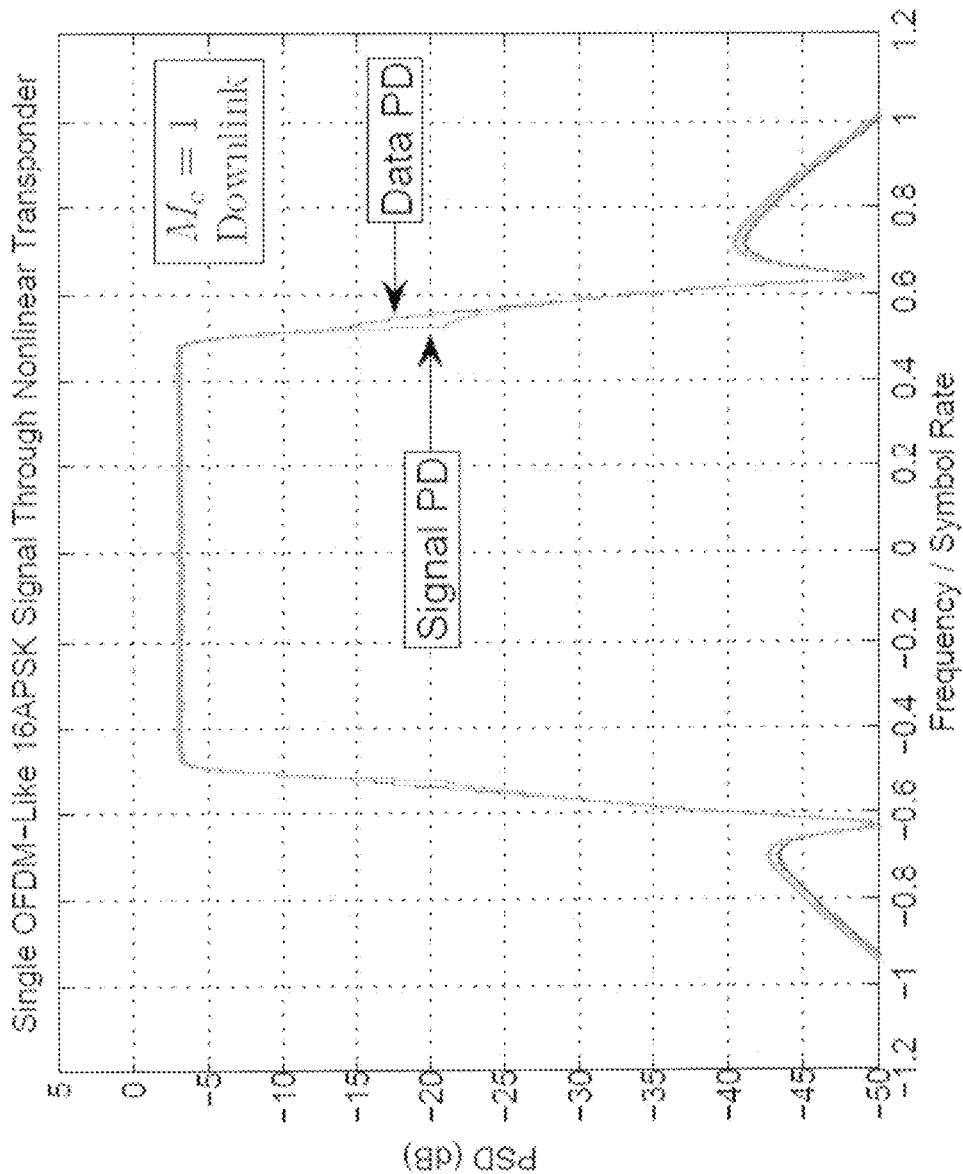
FIG. 9B is a PSD plot illustrating a downlink PSD in decibels as a function of the frequency/symbol rate at an optimal OBO level when applying a signal predistortion compensation scheme versus a data predistortion compensation scheme to an OFDM-like signal modulated using the 16APSK signal constellation.

FIGS. 9A-9B provide a comparison of the uplink (FIG. 5A) and downlink (FIG. 5B) PSDs when using a signal predistortion technique versus a data predistortion technique for the case of a single OFDM-like 16APSK signal, at their optimal OBO levels. The signal predistortion scheme is widely used in applications where the HPA and the predistorter are co-located. Methods include the classical Volterra-based inverse method, and a more recent successive signal predistortion method. However, signal predistortion is implemented at the oversampled signal after the transmit filtering operation. Thus, it requires a high sampling rate that is proportional to the product of the individual bandwidth of the signal, number of $M_c$ signals, their frequency separation $\Delta f$, and the degree of the nonlinearity to be compensated. In addition, signal predistortion causes spectral regrowth prior to the HPA, making it less suitable for broadband satellite applications with their strict uplink emission requirements. By contrast, the data predistortion technique in accordance with implementations described herein requires a sampling rate that equals the symbol rate only, does not cause uplink spectral regrowth, and provides better performance. It may contribute to the spectral regrowth on the downlink, but this is suppressed by the OMUX filtering present on-board a satellite.

For systems employing powerful FEC codes, a signal achievable information rate (AIR) may provide valuable insights into the expected outcome of coded packet error rate (PER) simulations and can be used to provide an instructive performance comparison between the implementations described herein. The achievable information rate in these examples is defined as the maximum rate at which information can be transmitted through a desired channel and is quantified in units of bits-per-symbol. This is illustrated in FIGS. 6-8 which plot the AIR, in units of bits/symbol, as a function of $$\left.\frac{E_s}{N_0}\right|_{NL} + OBO,$$

in dB, for the cases of $M_c=1$ and $M_c=3$, where $$\left.\frac{E_s}{N_0}\right|_{NL}$$

is the SNR used in operating the nonlinear transponder. The ordinate values in the AIR curves are selected to align with the spectral efficiencies, in bits/symbol, made available by the modulation-coding (MODCOD) pairs within the DVB-S2X standard. Data points in FIGS. 6-8 are reported at their respective optimum back-off value and are obtained by generating AIR curves over a range of OBO chosen with sufficient granularity and selecting the operating point value that minimizes the SNR at the desired AIR.

Figure 10:
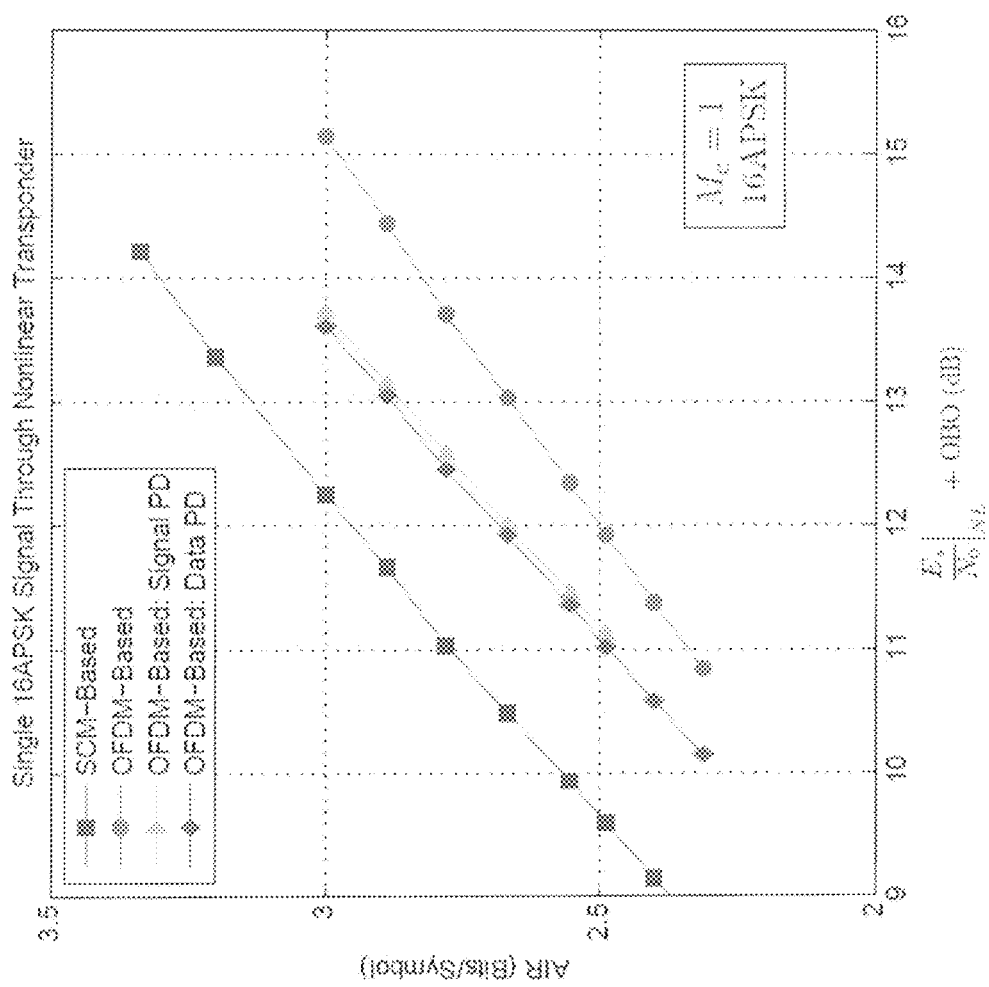
FIG. 10 is a plot showing, for a single 16APSK signal passing through a nonlinear satellite transponder, using four different satellite signaling schemes, the achievable information rate (AIR) in bits/symbol as a function of $$\left.\frac{E_s}{N_0}\right|_{NL} + OBO,$$

The AIR curves illustrate the effectiveness of the successive multicarrier data pre-distortion technique described herein when using OFDM-based signaling over nonlinear satellite channels. By way of example, FIG. 10 shows notable gains of 1 dB to 1.4 dB over a wide range of spectral efficiencies when using 16APSK. It is useful to note that the biggest improvement is observed at higher spectral efficiencies, thus making the data predistortion technique described herein particularly attractive in applications with high data rates. This is also evident in FIG. 11, which considers the case of 64APSK and $M_c=1$, and in which improvements of 3 dB to 4.5 dB are observed over the considered range of spectral efficiency. It is also noteworthy that the data predistortion technique described herein outperforms the successive signal predistortion technique by up to 0.3 dB. AIR results are extended to cover the case of the inner signal when $M_c=3$ for 16APSK shown in FIG. 12. These point to gains of 0.5 dB to 1.5 dB over an OFDM-based system with the enhanced receiver. The data predistortion technique described herein is seen to offer an improvement of 0.1 dB to 0.3 dB over the signal predistortion technique, with larger gains noted at the higher levels of spectral efficiency.

To pursue the gains indicated in the AIR figures, the case when capacity-approaching low-density parity-check (LDPC) codes are applied to generate PER performance curves was considered. In this case, all signals used the same code rate $R_c$ and had the same codeblock length of 64,800 bits. The systems using predistortion also used a receiver that employed BICM-ID where the number of internal LDPC decoder iterations was set at 5, while the number of outer iterations was set at 10. The receiver parameters, centroids, variances and correlation coefficients, that are used for the improved LLR computation, discussed above with reference to FIG. 4, were determined using an offline training mode involving transmitting known-symbol sequences through the system model under consideration. The OFDM-based system as well as the SCM-based system, employed an enhanced receiver architecture using an LDPC decoder with 50 internal iterations without BICM-ID.

FIG. 13 is a plot showing, for a single 16APSK signal with code rate 28/45 passing through a nonlinear satellite transponder, modulated using six different satellite signaling schemes, the packet error rate (PER) as a function of $$\left.\frac{E_s}{N_0}\right|_{NL} + OBO,$$

in decibels. Also reported in FIG. 13, denoted by bold vertical lines, are the information-theoretic SNR thresholds obtained from the AIR results in FIG. 10 at 2.48 bits/symbol. All curves are at their respective optimum OBO values. The PER data indicates an improvement of 1.4 dB for an OFDM-based system in accordance with the disclosure when data predistortion is applied at the transmitter. Additionally, data predistortion is 0.15 dB better than successive signal predistortion. The receiver-based successive soft distortion cancellation in accordance with the disclosure provides close to 1.2 dB improvement with OFDM-based signaling and an additional 0.3 dB improvement over a more conventional receiver-based iterative distortion cancellation scheme.

In a nonlinear satellite channel, the results of the coded simulations may be reported by plotting the total degradation (TD) required to achieve a target PER as a function of a target PER as a function of the OBO. The parameter TD, in dB, is defined as $$TD = OBO + \left.\frac{E_s}{N_0}\right|_{NL} - \left.\frac{E_s}{N_0}\right|_L, \tag{56}$$

where $$\left.\frac{E_s}{N_0}\right|_L$$

is the SNR required in a linear-AWGN channel to achieve a PER of $10^{-3}$.

FIG. 14 shows the total degradation versus OBO performance of 16APSK using the rate 28/45 LDPC code, in a setup of single signal per transponder. Each point on a total degradation chart represents the outcome of a complete coded error rate curve displayed at a target PER of $10^3$. From (56), it can be seen than an improvement in SNR translates directly to an improvement in total degradation. The combined solution of using data predistortion at the transmitter and soft interference cancellation at the receiver in accordance with the disclosure provides additional gain of about 0.2 dB beyond predistortion alone. In the combined solution, the estimate of the predistorted symbols are used in the distortion construction at the receiver.

FIG. 15 shows the total degradation versus OBO performance of 64APSK using the rate 7/9 LDPC code, in a setup of single signal per transponder. The data predistortion technique in accordance with the disclosure reduces the degradation of the OFDM-based system by almost 4 dB. The proposed receiver-based soft distortion cancellation technique in accordance with the disclosure also offers a comparable reduction in total degradation. The signal predistortion technique performs moderately worse, incurring an additional 0.3 dB in total degradation. These improvements are consistent with the margins predicted by the AIR results in FIG. 11 for 64APSK. In addition to a reduction in the total degradation, transmitter and receiver-based techniques in accordance with the disclosure also provide a substantial reduction in the required OBO for an OFDM-based system. As an example, FIG. 15 shows close to 2.5 dB and 3.4 dB reduction in required OBO when using successive data predistortion and iterative soft cancellation, respectively. Further, combined successive compensation at the transmitter and at the receiver extracts an additional 0.35 dB improvement beyond predistortion alone.

FIG. 16 shows the performance of the inner signal for the case when three signals share a transponder, each using 16APSK and LDPC code with rate 28/45. In this case, successive multicarrier data predistortion in accordance with the disclosure can accurately reconstruct the distortion experienced by the desired signal, leading to the successful mitigation of the resulting distortion. The results indicate a reduction of close to 1.4 dB in the minimum total degradation and a 0.5 dB improvement in the required OBO. The successive signal predistortion technique is worse by 0.4 dB. As illustrated, the gap between the OFDM-based system and the SCM system with enhanced receivers is significantly smaller than what is observed in the results of single signal per transponder case. Also, the predistorted systems are within 0.6 dB of each other.

FIG. 17 illustrates a computer system 1000 upon which example embodiments according to the present disclosure can be implemented. Computer system 1000 can include a bus 1002 or other communication mechanism for communicating information, and a processor 1004 coupled to bus 1002 for processing information. Computer system 1000 may also include main memory 1006, such as a random access memory (RAM) or other dynamic storage device, coupled to bus 1002 for storing information and instructions to be executed by processor 1004. Main memory 1006 can also be used for storing temporary variables or other intermediate information during execution of instructions to be executed by processor 1004. Computer system 1000 may further include a read only memory (ROM) 1008 or other static storage device coupled to bus 1002 for storing static information and instructions for processor 1004. A storage device 1010, such as a magnetic disk or optical disk, may additionally be coupled to bus 1002 for storing information and instructions.

Computer system 1000 can be coupled via bus 1002 to a display 1012, such as a cathode ray tube (CRT), liquid crystal display (LCD), active matrix display, light emitting diode (LED)/organic LED (OLED) display, digital light processing (DLP) display, or plasma display, for displaying information to a computer user. An input device 1014, such as a keyboard including alphanumeric and other keys, may be coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to one embodiment of the disclosure, OFDM-like signaling and nonlinear distortion correction, in accordance with example embodiments, are provided by computer system 1000 in response to processor 1004 executing an arrangement of instructions contained in main memory 1006. Such instructions can be read into main memory 1006 from another computer-readable medium, such as storage device 1010. Execution of the arrangement of instructions contained in main memory 1006 causes processor 1004 to perform one or more processes described herein. One or more processors in a multi-processing arrangement may also be employed to execute the instructions contained in main memory 1006. In alternative embodiments, hard-wired circuitry is used in place of or in combination with software instructions to implement various embodiments. Thus, embodiments described in the present disclosure are not limited to any specific combination of hardware circuitry and software.

Computer system 1000 may also include a communication interface 1018 coupled to bus 1002. Communication interface 1018 can provide a two-way data communication coupling to a network link 1020 connected to a local network 1022. By way of example, communication interface 1018 may be a digital subscriber line (DSL) card or modem, an integrated services digital network (ISDN) card, a cable modem, or a telephone modem to provide a data communication connection to a corresponding type of telephone line. As another example, communication interface 1018 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1018 sends and receives electrical, electromagnetic, or optical signals that carry digital data streams representing various types of information. Further, communication interface 1018 may include peripheral interface devices, such as a Universal Serial Bus (USB) interface, a PCMCIA (Personal Computer Memory Card International Association) interface, etc.

Network link 1020 typically provides data communication through one or more networks to other data devices. By way of example, network link 1020 can provide a connection through local network 1022 to a host computer 1024, which has connectivity to a network 1026 (e.g. a wide area network (WAN) or the global packet data communication network now commonly referred to as the "Internet") or to data equipment operated by service provider. Local network 1022 and network 1026 may both use electrical, electromagnetic, or optical signals to convey information and instructions. The signals through the various networks and the signals on network link 1020 and through communication interface 1018, which communicate digital data with computer system 1000, are example forms of carrier waves bearing the information and instructions.

Computer system 1000 may send messages and receive data, including program code, through the network(s), network link 1020, and communication interface 1018. In the Internet example, a server (not shown) might transmit requested code belonging to an application program for implementing an embodiment of the present disclosure through network 1026, local network 1022 and communication interface 1018. Processor 1004 executes the transmitted code while being received and/or store the code in storage device 1010, or other non-volatile storage for later execution. In this manner, computer system 1000 obtains application code in the form of a carrier wave.

The term "computer-readable medium" as used herein refers to any medium that participates in providing instructions to processor 1004 for execution. Such a medium may take many forms, including but not limited to non-volatile media, volatile media, and transmission media. Non-volatile media include, for example, optical or magnetic disks, such as storage device 1010. Volatile media may include dynamic memory, such as main memory 1006. Transmission media may include coaxial cables, copper wire and fiber optics, including the wires that comprise bus 1002. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

FIG. 18 illustrates a chip set 1100 in which embodiments of the disclosure may be implemented. Chip set 1100 can include, for instance, processor and memory components described with respect to FIG. 18 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1100 includes a communication mechanism such as a bus 1002 for passing information among the components of the chip set 1100. A processor 1104 has connectivity to bus 1102 to execute instructions and process information stored in a memory 1106. Processor 1104 includes one or more processing cores with each core configured to perform independently. A multi-core processor enables multiprocessing within a single physical package. Examples of a multi-core processor include two, four, eight, or greater numbers of processing cores. Alternatively or in addition, processor 1104 includes one or more microprocessors configured in tandem via bus 1102 to enable independent execution of instructions, pipelining, and multithreading. Processor 1004 may also be accompanied with one or more specialized components to perform certain processing functions and tasks such as one or more digital signal processors (DSP) 1108, and/or one or more application-specific integrated circuits (ASIC) 1110. DSP 1108 can typically be configured to process real-world signals (e.g., sound) in real time independently of processor 1104. Similarly, ASIC 1110 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1104 and accompanying components have connectivity to the memory 1106 via bus 1102. Memory 1106 includes both dynamic memory (e.g., RAM) and static memory (e.g., ROM) for storing executable instructions that, when executed by processor 1104, DSP 1108, and/or ASIC 1110, perform the process of example embodiments as described herein. Memory 1106 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 17. Various embodiments are described in terms of this example-computing module 1000. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
    a satellite transmitter comprising:
        a bit-to-symbol modulator to modulate a plurality of bits to form a plurality of data symbols;
        an orthogonal frequency-division multiplexing (OFDM) modulator to modulate the plurality of data symbols onto a plurality of OFDM subcarriers to form a plurality of OFDM modulated data symbols, wherein the plurality of OFDM modulated data symbols do not include cyclic prefix symbols;
        a pulse-shaping transmit filter to convert the plurality of OFDM modulated data symbols to a transmit signal using a pulse shaping function; and
        a modulator to modulate the transmit signal onto a carrier wave for transmission as a modulated transmit signal.

2. The system of claim 1, wherein the OFDM modulator is an inverse fast Fourier transform (IFFT) modulator.

3. The system of claim 2, wherein the satellite transmitter further comprises: a transmitter-based correction module to apply data predistortion to the plurality of data symbols or to the plurality of OFDM modulated data symbols.

4. The system of claim 3, wherein the transmitter-based correction module applies data predistortion to the plurality of OFDM modulated data symbols in the time domain.

5. A system, comprising:
    a satellite transmitter comprising:
        a first bit-to-symbol modulator to modulate a first plurality of bits to form a first plurality of data symbols;
        a second bit-to-symbol modulator to modulate a second plurality of bits to form a second plurality of data symbols;
        a first orthogonal frequency-division multiplexing (OFDM) modulator to modulate the first plurality of data symbols onto a first plurality of OFDM subcarriers to form a first plurality of OFDM modulated data symbols;
        a second OFDM modulator to modulate the second plurality of data symbols onto the second plurality of OFDM subcarriers to form a second plurality of OFDM modulated data symbols;
        a first pulse-shaping transmit filter to convert the first plurality of OFDM modulated data symbols to a first transmit signal using a pulse shaping function;
        a second pulse-shaping transmit filter to convert the second plurality of OFDM modulated data symbols to a second transmit signal using a pulse shaping function;
        a modulator to modulate the first transmit signal onto a carrier wave for transmission as a first modulated transmit signal;
        a modulator to modulate the second transmit signal onto a second carrier wave for transmission as a second modulated transmit signal; and
    an adder to add the first and second modulated transmit signals to generate a composite signal.

6. The system of claim 5, wherein each of the OFDM modulators are IFFT modulators.

7. The system of claim 6, wherein the number of the first plurality of OFDM subcarriers is not the same as the number of the second of the plurality of OFDM subcarriers.

8. The system of claim 6, wherein the transponder comprises an input multiplexing (IMUX) filter and output multiplexing (OMUX) filter, wherein the IMUX filter is to receive the composite transmit signal, and wherein the OMUX filter is to output the amplified composite signal.

9. The system of claim 5, wherein each of the plurality of OFDM modulated data symbols do not include cyclic prefix symbols.

10. The system, of claim 5, further comprising: a nonlinear satellite transponder to receive the composite signal, the transponder comprising a nonlinear amplifier for amplifying the composite transmit signal.

11. The system of claim 10, wherein the satellite transmitter further comprises: a transmitter-based correction module to apply data predistortion to the first and second pluralities of data symbols or to the first and second pluralities of OFDM modulated data symbols.

12. The system of claim 11, wherein the satellite transponder transmits the composite signal to a receiver, wherein the receiver includes a receiver-based correction module to provide frequency-domain distortion correction of symbol segments extracted from the composite signal.

13. The system of claim 5, wherein the system is a satellite gateway, wherein the composite signal is transmitted on an outroute.

14. A method, comprising:
modulating a first plurality of data symbols onto a first plurality of orthogonal frequency-division multiplexing (OFDM) subcarriers to form a first plurality of OFDM modulated data symbols;
modulating a second plurality of data symbols onto a second plurality of OFDM subcarriers to form a second plurality of OFDM modulated data symbols;
converting the first plurality of OFDM modulated data symbols to a first transmit signal using a pulse shaping function;
converting the second plurality of OFDM modulated data symbols to a second transmit signal using a pulse shaping function;
modulating the first transmit signal onto a first carrier wave;
modulating the second transmit signal onto a second carrier wave; and
adding the first and second modulated transmit signals to generate a composite signal for transmission by a satellite terminal.

15. The method of claim 14, wherein modulating the first plurality of data symbols onto a first plurality of OFDM subcarriers and modulating the second plurality of data symbols onto a second plurality of OFDM subcarriers comprises applying an inverse fast Fourier transform (IFFT) to each of the first and second pluralities of data symbols.

16. The method of claim 15, further comprising:
receiving the composite signal at a satellite transponder; and
amplifying the composite signal using a high power amplifier of the satellite transponder.

17. The method of claim 16, further comprising: broadcasting the amplified composite signal from the satellite transponder to one or more downlink receivers.

18. The method of claim 15, further comprising: applying data predistortion in the time domain to each of the first plurality and the second plurality of OFDM modulated data symbols.

19. The method of claim 15, wherein each of the plurality of OFDM modulated data symbols do not include cyclic prefix symbols.

20. A satellite receiver, comprising:
circuitry for downconverting an input signal received from a satellite transponder;
a receive pulse-shaping filter for filtering the downconverted signal;
a downsampler for downsampling the filtered signal;
a linear equalizer to equalize the downsampled signal to compensate for linear phase distortion caused by the satellite transponder; and
an orthogonal frequency-division multiplexing (OFDM) demodulator to segment signal samples output by the equalizer into a plurality of OFDM segments and to convert the plurality of OFDM segments into frequency domain symbols.

21. The satellite receiver of claim 20, wherein the OFDM demodulator is a fast Fourier transform (FFT) demodulator.

22. The satellite receiver of claim 20, further comprising: a log-likelihood ratio (LLR) computation module to compute the likelihood that particular symbols extracted from an input signal were transmitted by a satellite transmitter.

23. The satellite receiver of claim 22, wherein the LLR computation module receives as an input a plurality of symbol segments output by the OFDM demodulator.

24. The satellite receiver of claim 22, further comprising: a receiver-based correction module to provide frequency-domain distortion correction of symbol segments output by the OFDM demodulator, wherein the receiver-based correction module receives as an input a plurality of symbol segments output by the OFDM demodulator.

25. The satellite receiver of claim 24, wherein the LLR computation module receives as an input a plurality of error-corrected symbol segments output by the receiver-based correction module.

26. The satellite receiver of claim 24, further comprising a forward error correction (FEC) decoder, wherein the receiver-based correction module iteratively exchanges soft information with the FEC decoder to converge on an estimation of transmitted symbols.

27. The satellite receiver of claim 20, wherein the input signal is a composite signal comprising a plurality of signals, each of the plurality of signals modulated on a respective carrier, wherein the circuitry is configured to downconvert the composite signal to baseband, wherein one of the plurality of signals is output by the receive pulse-shaping filter.

28. The satellite receiver of claim 27, further comprising: a receiver-based correction module to provide frequency-domain distortion correction of symbol segments output by the OFDM demodulator, wherein the receiver-based distortion correction module corrects for distortion from the plurality of signals.

29. The satellite receiver of claim 28, further comprising: plurality of LLR computation modules and a plurality of FEC decoder modules, each of the plurality of LLR computation modules to receive a plurality of error-corrected symbol segments corresponding to a respective one of the plurality of signals, and each of the plurality FEC decoders to converge on an estimate of transmitted symbols of a respective one of the plurality of signals, wherein the receiver-based correction module iteratively exchanges soft information with each of the plurality of FEC decoders.

* * * * *